United States Patent
Russo

(10) Patent No.: US 11,141,900 B2
(45) Date of Patent: Oct. 12, 2021

(54) MODULAR PIPE FORMATION APPARATUS

(71) Applicant: TUBI LIMITED, Paddington (AU)

(72) Inventor: Marcello Russo, Paddington (AU)

(73) Assignee: TUBI LIMITED, New South Wales (AU)

( * ) Notice: Subject to any disclaimer, the term of this patent is extended or adjusted under 35 U.S.C. 154(b) by 0 days.

(21) Appl. No.: 16/830,797

(22) Filed: Mar. 26, 2020

(65) Prior Publication Data

US 2020/0230858 A1    Jul. 23, 2020

Related U.S. Application Data

(63) Continuation-in-part of application No. 15/647,920, filed on Jul. 12, 2017, which is a continuation of
(Continued)

(30) Foreign Application Priority Data

Jan. 22, 2010  (AU) ............................... 2010900251
Mar. 26, 2019  (AU) ............................... 2019901016

(51) Int. Cl.
    *B29C 48/09*    (2019.01)
    *B29C 48/025*   (2019.01)
    (Continued)

(52) U.S. Cl.
    CPC ............ *B29C 48/13* (2019.02); *B29C 48/025* (2019.02); *B29C 48/09* (2019.02); *B29C 48/265* (2019.02);
    (Continued)

(58) Field of Classification Search
    CPC ..... B29C 48/025; B29C 48/09; B29C 48/265; B29C 48/266; B29C 48/2665;
    (Continued)

(56) References Cited

U.S. PATENT DOCUMENTS 3,317,219 A    5/1967  Hindin
3,359,605 A   12/1967  Hulverson et al.
                       (Continued)

FOREIGN PATENT DOCUMENTS

AU    636402 B2    4/1993
CL    48783        6/2010
                   (Continued)

OTHER PUBLICATIONS

National Library of Australia web page showing availability of F1 book from Australian libraries, pp. 361-362, 2016.
(Continued)

*Primary Examiner* — Xiao S Zhao
*Assistant Examiner* — Joseph S Leyson
(74) *Attorney, Agent, or Firm* — Occhiuti & Rohlicek LLP

(57) ABSTRACT

A modular plastic pipe formation apparatus to extrude plastic pipe is disclosed and includes a plurality of modules each having a transportable container and at least one component of the pipe formation apparatus located therein. The plurality of modules are aligned in a predetermined manner during formation of plastic pipe with the components aligned for pipe extrusion. The apparatus may also include a closed circuit fluid cooling system to provide cooling fluid to some of modules to cool the pipe being formed, the cooling circuit may flows in a counter direction to the direction of pipe forming in the pipe formation apparatus.

11 Claims, 16 Drawing Sheets

Related U.S. Application Data application No. 13/574,537, filed as application No. PCT/AU2011/000066 on Jan. 21, 2011, now abandoned.

(51) Int. Cl.

| | |
|---|---|
| *B29C 48/275* | (2019.01) |
| *B29C 48/88* | (2019.01) |
| *B29C 48/13* | (2019.01) |
| *B29C 48/28* | (2019.01) |
| *B29C 48/90* | (2019.01) |
| *B29C 48/265* | (2019.01) |
| *B29C 48/30* | (2019.01) |
| *B29C 48/355* | (2019.01) |
| *B29C 48/25* | (2019.01) |
| *B29C 49/00* | (2006.01) |
| B29C 48/00 | (2019.01) |
| B29C 48/29 | (2019.01) |
| B29C 48/285 | (2019.01) |
| B29L 16/00 | (2006.01) |
| B29L 23/00 | (2006.01) |
| B29L 23/18 | (2006.01) |

(52) U.S. Cl.
CPC ........ *B29C 48/2665* (2019.02); *B29C 48/276* (2019.02); *B29C 48/28* (2019.02); *B29C 48/303* (2019.02); *B29C 48/355* (2019.02); *B29C 48/90* (2019.02); *B29C 48/919* (2019.02); *B29C 48/9115* (2019.02); *B29C 49/0021* (2013.01); *B29C 48/0022* (2019.02); *B29C 48/287* (2019.02); *B29C 48/288* (2019.02); *B29C 48/29* (2019.02); *B29C 48/905* (2019.02); *B29C 2793/009* (2013.01); *B29L 2016/00* (2013.01); *B29L 2023/18* (2013.01); *B29L 2023/22* (2013.01); *Y02P 70/10* (2015.11)

(58) Field of Classification Search
CPC ..... B29C 48/276; B29C 48/28; B29C 48/288; B29C 48/32; B29C 48/355; B29C 48/90; B29C 48/905; B29C 48/9115; B29C 48/9125; B29C 48/913; B29C 48/919
See application file for complete search history.

(56) References Cited

U.S. PATENT DOCUMENTS

| | | |
|---|---|---|
| 3,876,351 A | 4/1975 | Takada |
| 3,925,679 A | 12/1975 | Berman et al. |
| 4,072,453 A | 2/1978 | Oltmanns et al. |
| 4,115,495 A * | 9/1978 | Hartitz .................. B29C 71/02 264/567 |
| 4,382,734 A | 5/1983 | Synowiec et al. |
| 4,750,304 A | 6/1988 | Bischoff |
| 4,992,669 A | 2/1991 | Parmley |
| 4,993,125 A | 2/1991 | Capron et al. |
| 5,008,051 A | 4/1991 | DeCoursey et al. |
| 5,251,832 A | 10/1993 | Hentschel |
| 5,285,205 A | 2/1994 | White |
| 5,340,295 A * | 8/1994 | Preiato .................. B29C 48/06 425/71 |
| 5,531,583 A | 7/1996 | Berns et al. |
| 6,017,477 A | 1/2000 | Lu et al. |
| 7,018,139 B1 | 3/2006 | Slemons |
| 7,624,885 B2 | 12/2009 | Pfau |
| 8,444,894 B2 | 5/2013 | Fernandez De Mendiola Quintana et al. |
| 8,951,029 B2 | 2/2015 | Wilkie |
| 2005/0140100 A1 | 6/2005 | Peter |
| 2010/0308493 A1* | 12/2010 | Sehnal .................. B29C 48/276 264/176.1 |
| 2011/0259773 A1 | 10/2011 | Chen |

FOREIGN PATENT DOCUMENTS

| | | |
|---|---|---|
| CN | 101481960 A | 7/2009 |
| CN | 101614301 A | 12/2009 |
| EP | 1704984 A1 | 9/2006 |
| GB | 802261 A | 10/1958 |
| WO | 2008/001408 A2 | 1/2008 |
| WO | 2011/088516 A1 | 7/2011 |

OTHER PUBLICATIONS

Foster, "The Design and Benefits of Containerised Modular Plant Design", in Recent Advances in Mineral Processing Plant Design, by D. Malhotra, et al. (Ed), pp. 544-554, SME 2009.

Amazon Book web page showing availability of F1 book, pp. 358-360; 2016.

Expert Declaration of Neil Blenman, with list of annexures; (1-20); 2016.

Expert Declaration of Jeremy Bowman, with list of annexures; (1-19); 2016.

Expert Declaration of Nicholas Feros, with list of annexures; (1-5); 2016.

Expert Declaration of Joshua Gotham, with list of annexures; (1-7); 2016.

Expert Declaration of George Macovaz, with list of annexures; (1-7); 2016.

Expert Declaration of Mick Rathbone, with list of annexures; (1-27); 2016.

Expert Declaration of Adrian Richards, with list of annexures; (1-4); 2016.

Expert Declaration of Campbell Seccombe, with list of annexures; (1-16); 2016.

Expert Declaration of Jason Vanajek, with list of annexures; (1-16); 2016.

* cited by examiner

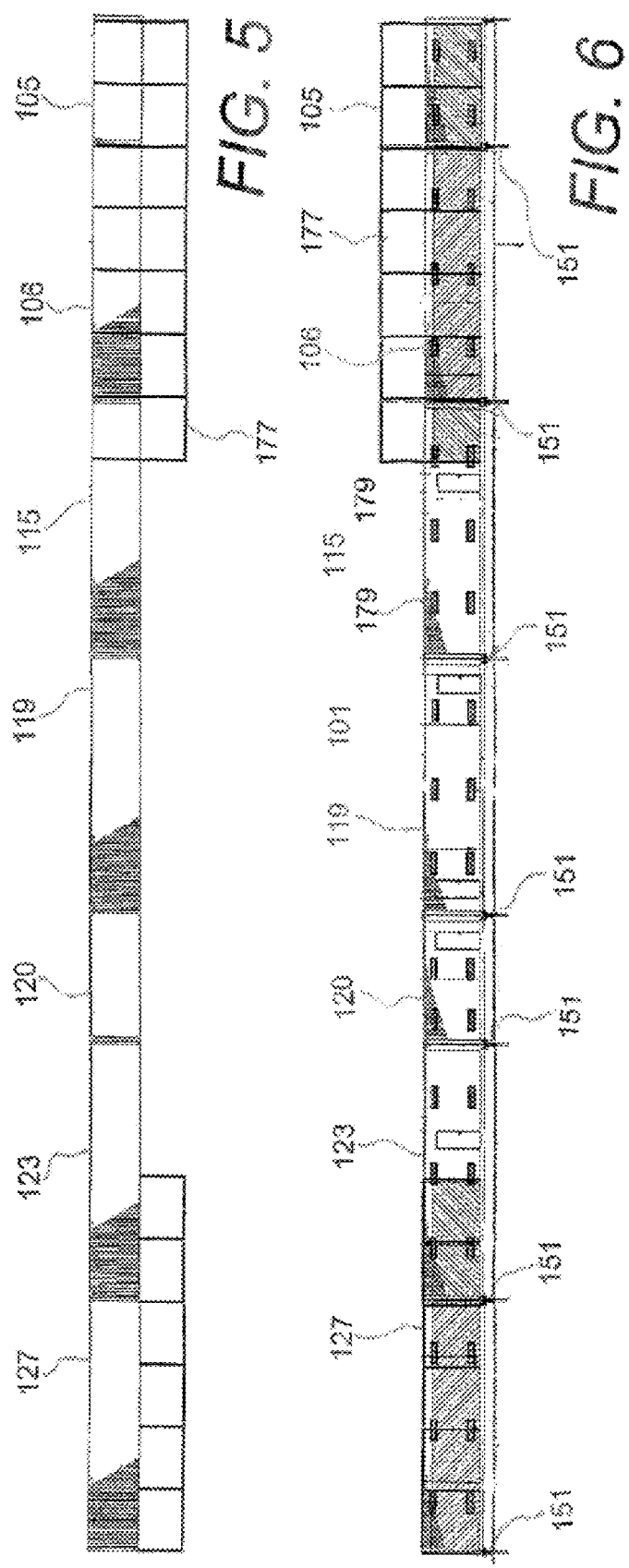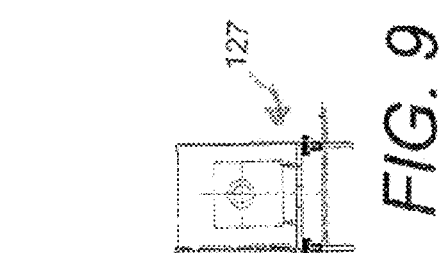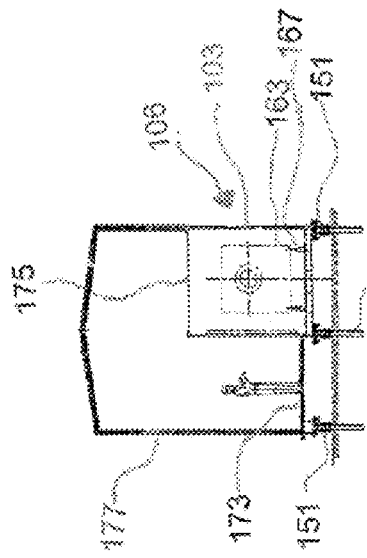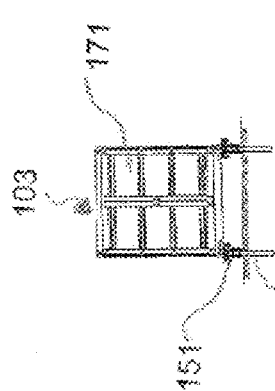

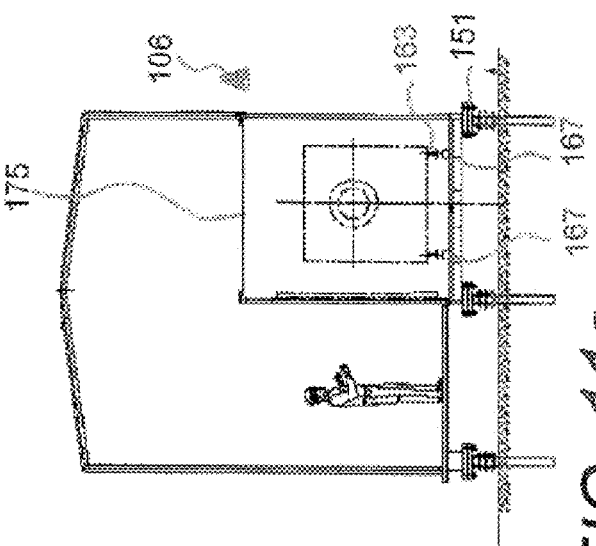
FIG. 11a
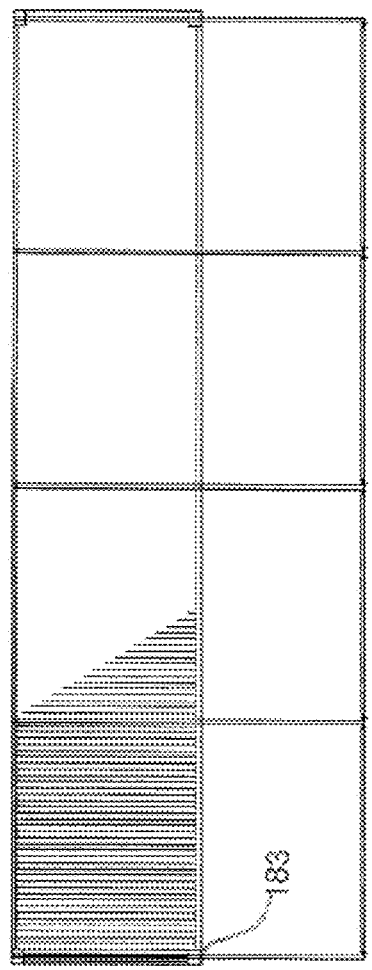
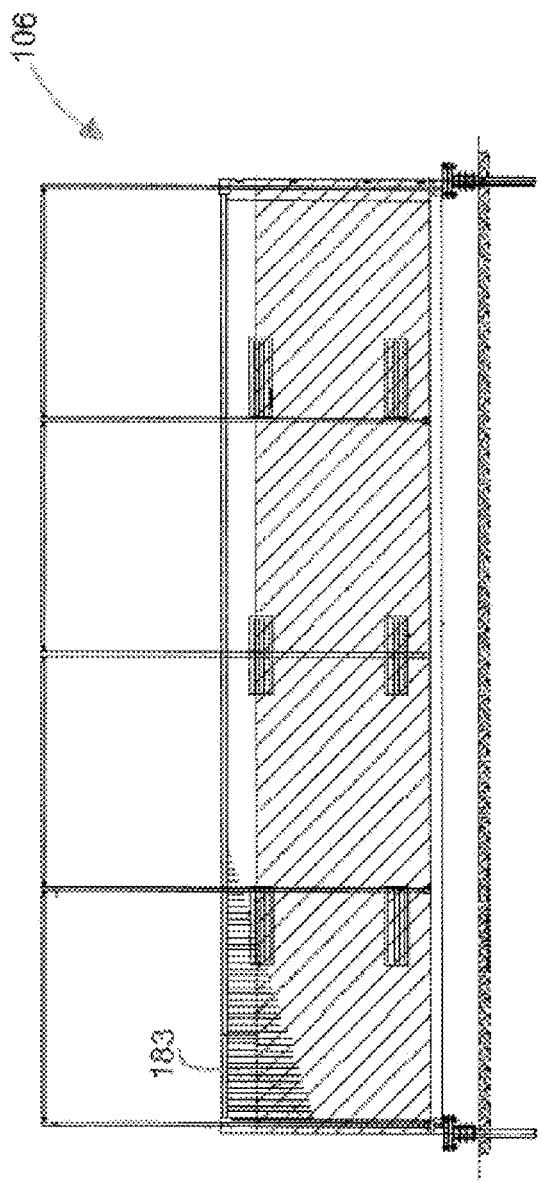
FIG. 11b
FIG. 11c

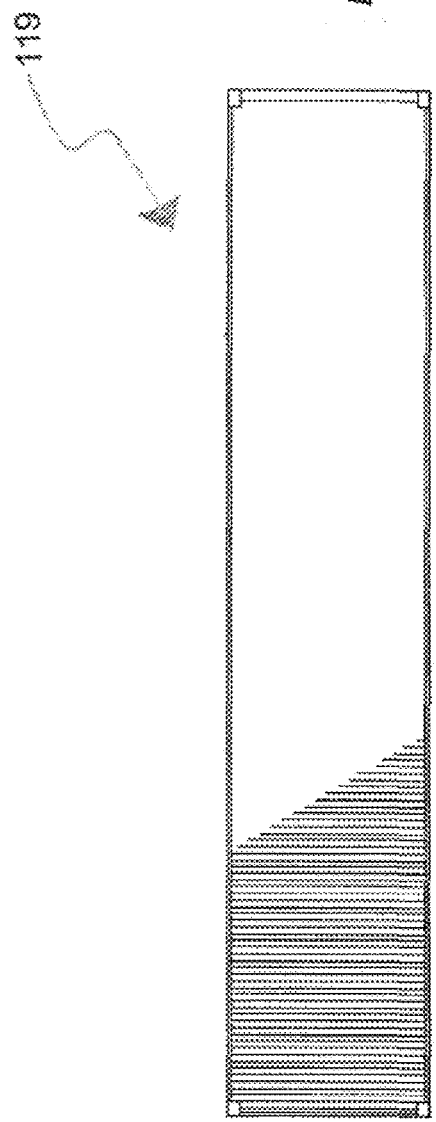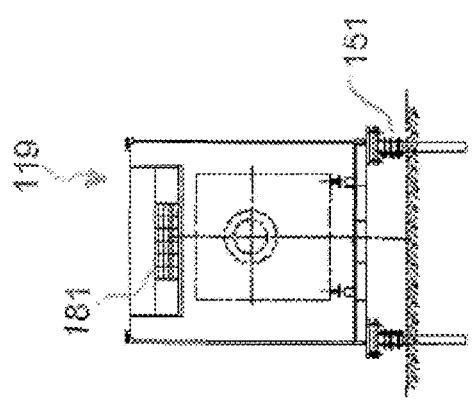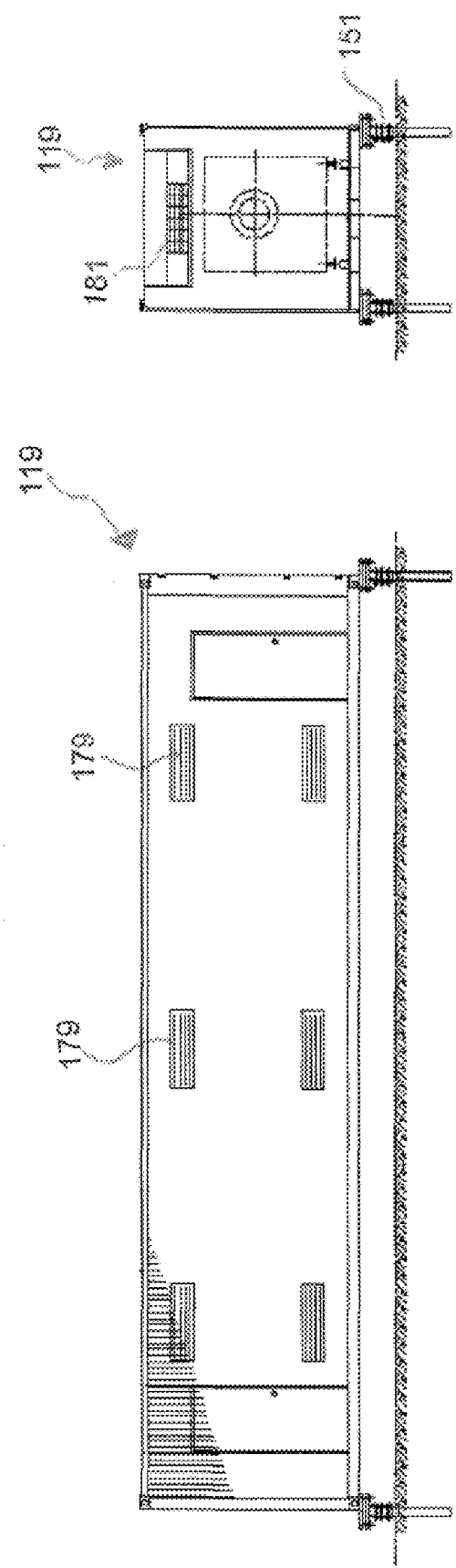

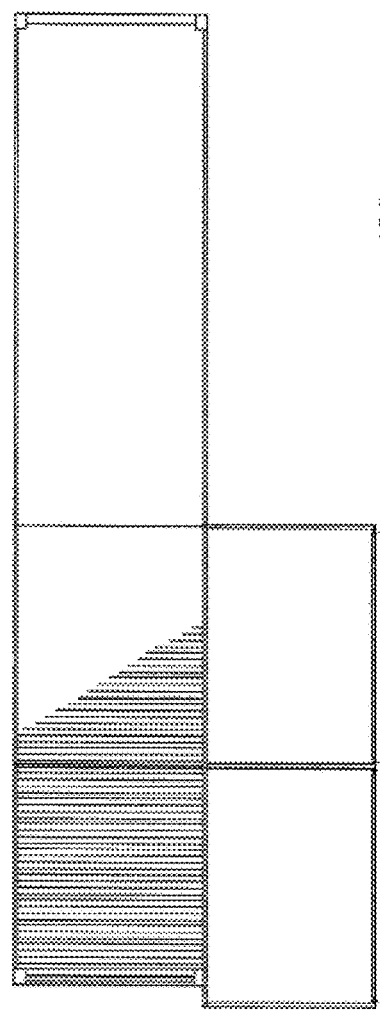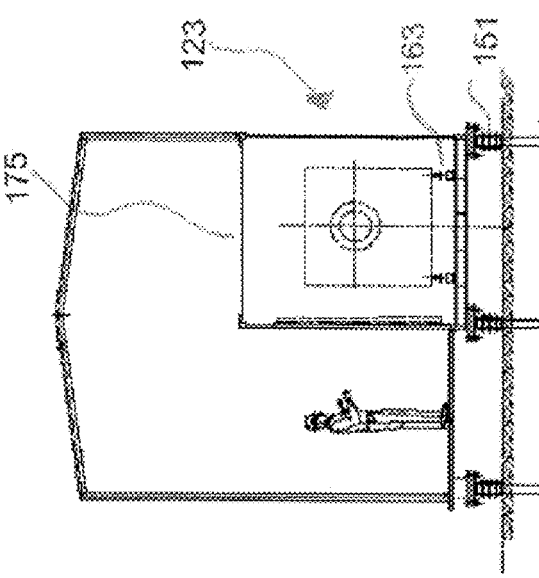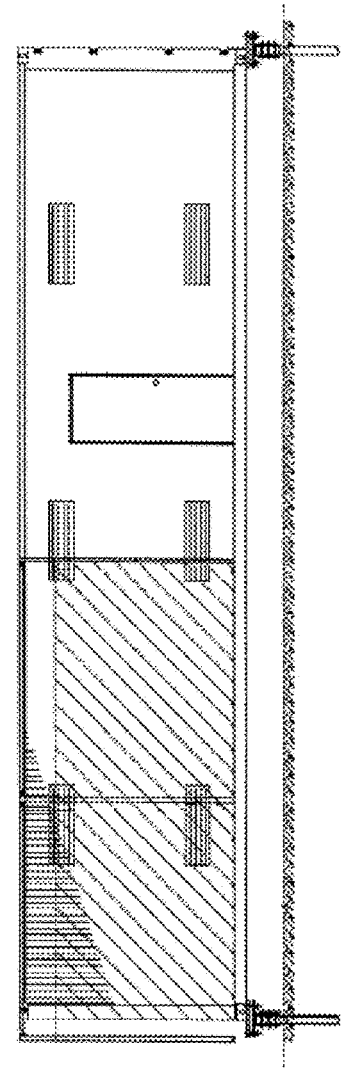

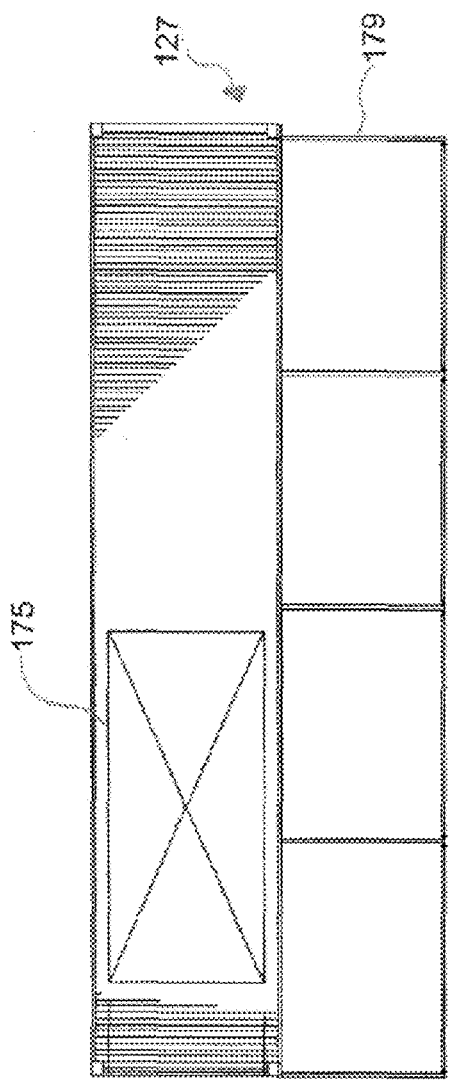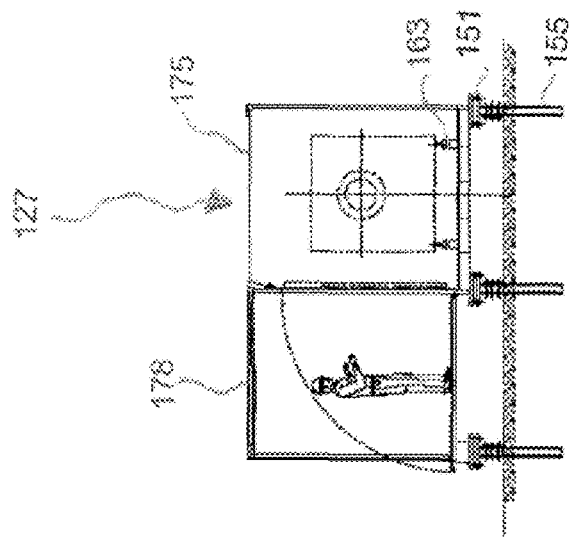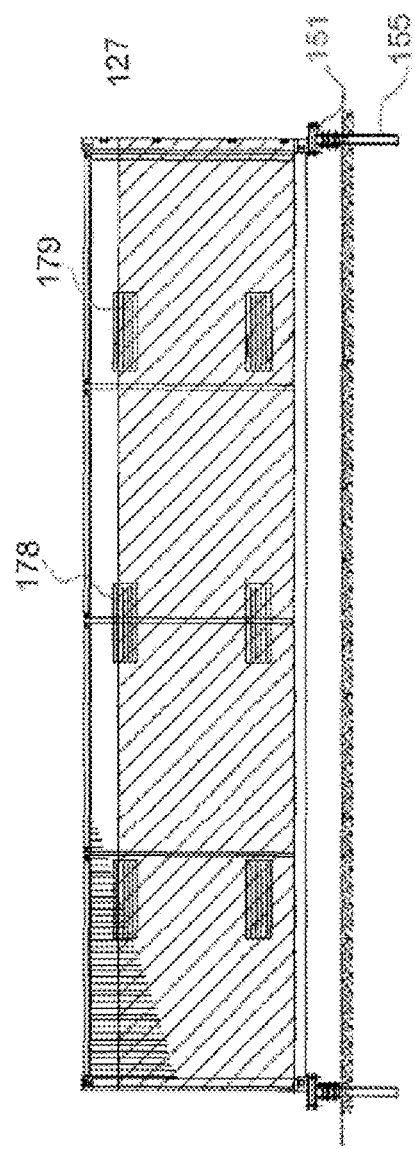

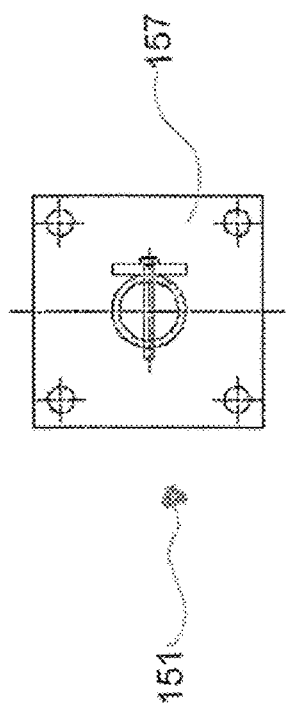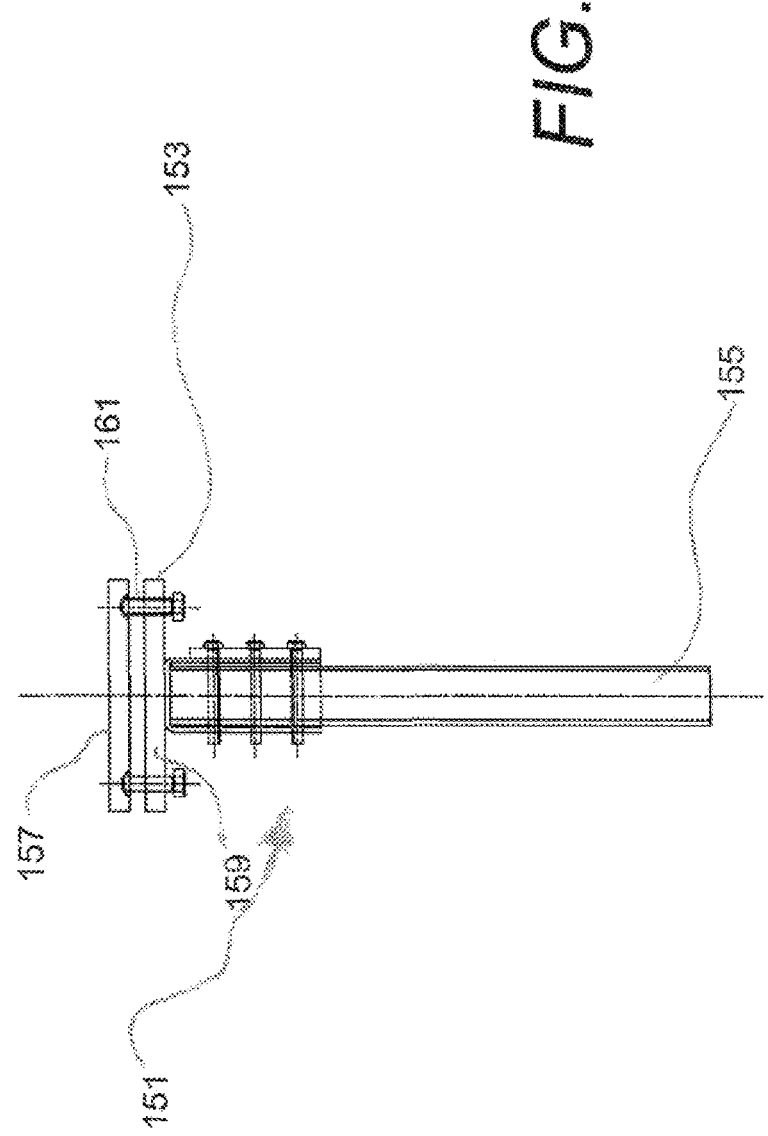

MODULAR PIPE FORMATION APPARATUS

CROSS REFERENCE TO RELATED APPLICATIONS

This application is a Continuation-In-Part (CIP) of U.S. application Ser. No. 15/647,920 filed on Jul. 12, 2017, which is a continuation of application Ser. No. 13/574,537 filed Oct. 16, 2012, which is a National Stage of International Application No. PCT/AU2011/000066 filed on Jan. 21, 2011 and claims priority to Australian Application No. 2010900251 filed Jan. 22, 2010. This application also claims priority from Australian Application No. 2019901016 filed on Mar. 26, 2019. The entire contents of these applications are incorporated herein by reference in their entireties.

TECHNICAL FIELD

A plastic pipe formation apparatus is disclosed. Also disclosed is a method of relocating and assembling a pipe formation apparatus, and a system for the production of plastic pipe. The apparatus can be modularised and transported, and finds particular application for use in manufacturing plastic pipe on site, or in close proximity of the pipe laying site. However, it is to be appreciated that the apparatus has broader application, and is not limited to such use.

BACKGROUND ART

Plastic pipe (in particular HDPE pipe) has a variety of industrial uses, including water supply, sewerage and waste water, transportation of gas and liquids, as well as a protective barrier for electrical and telecommunication cables. Plastic pipes are particularly useful as they are corrosion resistant flexible and offer weight advantages compared to alternative pipe construction materials such as copper, cast-iron and other metals. These qualities provide significant cost savings, and plastic pipes have been utilised extensively in the water, agriculture, mining, construction, infrastructure, energy, electrical and telecommunication sectors.

Plastic pipes are manufactured by pipe extrusion inside a factory, thereby allowing production in a controlled environment. Plastic pipe extrusion generally involves feeding raw plastic material through a hopper into the barrel of the extruder. Inside the barrel, a rotating screw rotates and advances the plastic feed, with the assistance of heaters, to melt and pressurise the plastic feed into molten plastic. The pressurised molten plastic is then forced through a die having an annular profile, thereby producing an extruded pipe. The newly extruded pipe is then passed through a series of cooling tanks, that spray water to solidify the plastic pipe. The pipes may then be coiled for storage and/or transportation before pipe laying.

With larger diameter pipes, there can be substantial difficulty in coiling the pipe to a coil which can be transported for long distances. For example, the pipe may be manufactured from a factory in an industrial area which needs to be transported by conventional means such as by ship, road and rail. These modes of transport have physical limitations on size and bulk of cargo, therefore large diameter pipes are usually manufactured in sections of manageable size and weight, typically with a length of 20 metres. These sections are transported to the site for pipe laying, where multiple sections are joined together by a coupling, which may involve plastic welding of the ends of the pipe sections. Such coupling of the pipe sections is time consuming and adds additional costs to labour and materials.

SUMMARY OF THE DISCLOSURE

In a first aspect, a modular plastic pipe formation apparatus is disclosed, the apparatus comprising a plurality of modules wherein each module comprises at least one component of the pipe formation apparatus located therein, wherein the plurality of modules are aligned in a predetermined manner during formation of plastic pipe.

By modularising at least part of the pipe formation apparatus, pipe manufacture can take place on site (at least for bulky, space-consuming stages). This can save on transportation and cost, as outlined in detail hereafter.

In one form, one of the plurality of modules comprise a plastic extruder. The one of the plurality of modules comprising the plastic extruder may further comprise a plastic raw material dryer and a die head.

In one form, the one of the plurality of modules comprising the plastic extruder further comprises a pipe corrugator to corrugate extruded pipe from the die head.

In an alternative form, the plastic pipe formation apparatus further comprises a corrugator module for positioning adjacent to the one of the plurality of modules comprising the plastic extruder, to receive therefrom and corrugate extruded pipe. A separate corrugator module allows the operator to selectively configure the machine to produce straight wall or corrugated pipe, by simply inserting or removing the corrugator module from the plastic pipe formation apparatus.

In one form of the modular plastic pipe formation apparatus, at least another one of the components comprises a cooling tank. In a further form, two or more cooling tank modules are provided in series to receive extruded plastic pipes therein for cooling. The cooling tank cools the hot extruded plastic pipe to a solid state. Typically, the cooling tank contains a water spray for cooling the plastic.

In yet a further form, a first of the two or more cooling modules comprises a vacuum water tank. The vacuum assists extruding the molten plastic pipe from the die head.

In a further form, the modular plastic pipe formation apparatus further comprises one or more modules comprising one or more of the following components: a haul off caterpillar, a cutter, a pipe sliding table, a tipping table, and a coiler.

In one form, the plurality of modules are aligned in a predetermined manner during formation of plastic pipe.

In another form, a module or each module of the plastic pipe formation apparatus is adapted to be transportable.

In one form of the modular plastic pipe formation apparatus, the plurality of modules are adapted to be coupled to each other in use, and decoupled from each other during transportation of the apparatus.

In one form of the modular plastic pipe formation apparatus at least one of the modules comprises a standardised shipping container, optionally modified for use in the apparatus. In an alternative form, at least one of the modules comprises a container or supporting framework for use in the apparatus and having at least some of the features of a standardised shipping container to facilitate its transportation. By providing modules having features of standard shipping containers, it allows the modules to be handled and transported using existing vehicles and infrastructure. This keeps the costs of transporting the apparatus to a minimum.

In one form of the modular plastic pipe formation apparatus, the adjacent modules are adapted for being locked together during pipe formation. Locking the modules together ensures the modules are in their desired predetermined arrangement. Thus, the operator can be confident the modules are correctly arranged, and will not deviate in position.

In one form, the modular plastic pipe formation apparatus further comprises an adjustment mechanism for closely positioning adjacent modules prior to locking them together. This mechanism may take the form of a winch, with a winch base attached to one module, and the end of a winch cable attached to another module, the operation of the winch drawing the modules together. This allows the modules to be initially positioned in a roughly arranged arrangement by a crane. Subsequently, the adjustment mechanism allows the modules to be closely positioned and aligned to each other. This avoids using cranes to position modules in precise locations, which can be difficult given the modules may be the size of shipping containers, which are bulky and awkward to lift and position.

In one form, the modular plastic pipe formation apparatus further comprises external supports for supporting respective modules. The external supports can comprise adjustable jacks to adjust the position or angle of the supported module. In another form, the external supports further comprise piles for securing into underlying ground. The external supports allow the modules to be placed and used on uneven or softer ground, as well as providing ground clearance for water drainage.

In one form, the position or angle of a component at one module is adjustable with respect to its module. In a further form, the plurality of components disposed within the modules are adjustable in position or angle, enabling the plurality of components to be aligned for pipe formation. This allows the components of pipe forming apparatus to be aligned even if the supporting modules are not perfectly aligned. This may be advantageous where the production site is not perfectly level, or if the modules have not been precisely arranged.

In one form, the apparatus further comprises a reference laser beam to aid in alignment of the components and/or the modules.

In a second aspect, a pipe formation system is disclosed comprising:
a plurality of modules with each module comprising at least one component of the pipe formation system; and
an alignment mechanism for aligning a component in one module with a component in another module.

In one form of the system, the modules are configurable as transportable containers, the manufacturing system further comprising a transporter for conveying the modules to and from a pipe production site, with the transportable containers and transporter together providing a mobile pipe manufacturing system. The transporter may be in the form of a semi-trailer, rail car or a container ship.

In one form, at least one component of the system is a plastic extruder.

In one form, the pipe formation system further comprises a coiler optionally disposed with respect to a module.

In one form, the pipe formation system further comprises pipe trailers for transporting pipe to the pipe laying site.

In one form, the pipe formation system further comprises a power generation unit optionally disposed with respect to a module.

In one form, the pipe formation system further comprises a chilling unit for providing a closed circuit cooling water supply to a cooling tank component, the chilling unit and/or the cooling tank each optionally disposed with respect to a module.

With the power generation unit and the chilling unit as a modular and transportable part of the pipe formation system, the pipe formation system can be self sufficient, without reliance on existing infrastructure such as a power grid and plumbing at the production site. This allows the system to be employed at a production site in a remote location.

In one form, hot air may be extracted from inside the freshly extruded pipe, or from other locations in the pipe formation system or apparatus. This hot air can be recycled to the raw material dryer for use in drying the raw material. This can reduce the energy requirements of the system.

In another aspect, a method for forming plastic pipe employing a form of the apparatus of the first aspect is disclosed. The method comprises:
arranging two or more respective modules with respect to each other;
and arranging two or more respective components of the pipe formation apparatus with respect to each other.

In a further form, the method further comprises forming plastic pipe.

In another aspect, a method of forming plastic pipe is disclosed, using a modular plastic pipe formation apparatus that comprises a plurality of modules supporting components of the pipe formation apparatus, the method comprising:
arranging the plurality of modules in a predetermined manner at a production site;
arranging two or more respective components of the pipe formation apparatus;
supplying the plastic pipe formation apparatus with plastic raw material;
coupling the modules together; and
aligning the components of the plastic formation apparatus to enable pipe formation.

In a further form, the coupling of the modules and arranging of the components comprises:
locking the modules together.

In one form of the method, the components are aligned using a laser for determining the position of the components and then, as necessary, adjusting alignment of the components.

In another aspect, a method of establishing a mobile plastic pipe manufacturing site is disclosed. The site that is adapted to locate a modular plastic pipe formation apparatus that comprises a plurality of modules supporting components of the pipe formation apparatus. The method comprises:
transporting the modules to the site;
arranging the modules in a predetermined manner at the site;
coupling the modules together;
aligning the components of the plastic formation apparatus to enable pipe formation;
supplying raw materials, power and water to the plastic pipe formation apparatus; and
forming plastic pipe.

In one form of the method, the coupling of the modules together comprises locking the modules together.

In one form of the method, the modules and the components are initially configured in a transportable state, with the method further comprising configuring the components and modules to a production state after the step of transporting the modules to the production site.

In one form of the method, after plastic pipe manufacturing at the production site has ceased, the modular plastic pipe formation apparatus may be relocated and set up at a second production site, with the method then comprising:
decoupling the modules;
configuring the components and modules to a transportable state;
transporting the modules from the production site to the second production site;
positioning the modules in a predetermined manner;
coupling the modules together;
supplying raw materials, power and water to the plastic pipe formation apparatus; and
manufacturing plastic pipe.

The apparatus, system and methods disclosed herein allow production of pipe at remote locations, whereby pipe formation may be performed at close proximity to where the pipe will be used. This reduces transportation of the finished product, which can be considerably expensive to transport for long distances. Thus actual transportation costs are reduced as the finished product may not even need to travel at all from the point of manufacture to the site. This also considerably reduces the timeline from when the pipe is manufactured to when it is delivered, therefore the installation time is also reduced.

Furthermore, as the manufactured pipe only needs to move a relatively short distance between manufacturing and pipe laying, the length of pipe produced can be increased. Transportation of large sections may be achieved by utilising specialised pipe trailers to move the pipes from the production location to the pipe laying location. Manufacturing can even take place adjacent to where pipe is to be laid.

By producing longer lengths of pipe the number of welds and couplings between pipe sections can be reduced, leading to less material, labour and overall costs for the pipeline. In addition, fewer welds and couplings lead to less chance of defects in the couplings and less chance of compromising the integrity of the pipeline.

In addition, longer pipe sections and shorter transport distances reduces overall handling of the pipe, and reduces possibility of freight damage of the pipe in transit. In addition, shorter transport distances improves public safety as bulky pipes do not need to travel long distances on public roads.

A mobile pipe manufacturing facility also allows the supply of pipe that may otherwise be logistically difficult to deliver. For factory-produced pipes, there has been a reliance on transportation capable of transporting manufactured pipe between the factory and pipe site. In remote locations, traditional transportation methods may not have the capacity to transport bulky pipe through rugged or remote terrain. By providing a mobile pipe manufacturing facility, the pipe extrusion machine itself may be separated into manageable, containerised modules. These modules may then be more easily transported to a remote location, and set up to manufacture pipe on location.

Furthermore, in this system, by providing the pipeline customer with means to produce pipe at close proximity to the site, it allows additional flexibility for the customer to easily and rapidly change pipe specifications, and to increase or decrease production of pipe. This flexibility improves delivery time and simplifies storage and handling costs on site.

The apparatus and systems disclosed allows for rapid set up and take down of a pipe extrusion plant, and effective pipe manufacture to high tolerance. Nonetheless, difficulties may remain in operating such a plant particularly when set up remotely where essential services, including water and power, may not be accessible. In such circumstances, these services may need to be supplied by the plant. Even if some or all of these services are available, improvements in the efficient operation of the plant is desirable to reduce the cost of production of the pipe. Accordingly, efficient use of services in the production of pipe is beneficial, both in terms of reliability and cost of production.

In one form, the modular plastic pipe formation apparatus or system further comprising a closed circuit fluid cooling system to provide cooling fluid to more than one of the plurality of modules and includes a cooling arrangement to cool the fluid in the circuit; wherein the input temperature of the cooling fluid being introduced into the modules varies between at least some of the modules.

The modular plastic pipe formation apparatus may be in any form as described above and may form part of a system or facility that is mobile and arranged to be deployed remotely.

Typically, the pipe needs to be cooled from approximately 200° C. to 40° C. along the extrusion line. In one arrangement, multiple cooling modules are provided through which the extruded piped is passed and the input temperature of the cooling fluid to respective modules is arranged to be the same regardless of the underlying temperature of the extruder pipe in these modules. To enable such an approach, the cooling fluid circuit is arranged with the modules in parallel in the circuit such that the input temperature is the same in all modules. Typically, the cooling fluid is water which is sprayed on the pipe to cool the pipe. This water is collected in the module so as to remain in the circuit where it is passed back to a cooling arrangement (such as a chiller unit) to be cooled. The change in temperature of the cooling fluid in these instances may only be a few degrees (for example less than 5° C.). However, the volume of water may be significant (say greater than 10 m3/h).

However, it has been found that effective cooling of the extruder pipe can occur with the input temperature varying in the different modules. The input temperature of those modules that are more upstream can be higher (because of the higher temperature of the extruded pipe upstream) and can still allow for adequate cooling rates. By allowing varying input temperatures, both the water usage and energy can be significantly reduced.

In one form, the modules are designed to be arranged in series in the fluid circuit and the circuit flows in a counter direction to the direction of pipe extrusion. With this arrangement, the cooling fluid progressively heats in the circuit as it moves through the modules. The build up of temperature in the cooling fluid allows for use of the waste heat (say for use in material drying) and/or cooling through exposure to ambient temperature. It has been found that with this arrangement, the cooling that is not attributable to the chiller can significantly increase to greater than 90% of total cooling. This significantly reduces the energy requirement of the production process. Moreover, the volume of fluid that is required to be used in the closed circuit can be significantly reduced. Unlike the previously described arrangement where the modules are in parallel thereby necessitating multiple circuits, having the modules in series in the fluid circuit requires only a single circuit allowing for a proportional drop in fluid flow through the circuit.

Also disclosed is a modular plastic pipe formation apparatus to extrude plastic pipe comprising a plurality of modules wherein each module comprises at least one component of a pipe forming apparatus located therein, the apparatus further comprising a closed circuit fluid cooling system to provide cooling fluid to a plurality of the modules; wherein the cooling circuit passes through the plurality of the modules in a counter direction to the direction of pipe forming in the pipe formation apparatus.

Also disclosed is a modular plastic pipe formation apparatus to extrude plastic pipe comprising a plurality of modules wherein each module comprises at least one component of a pipe forming apparatus located therein, the apparatus further comprising a fluid cooling system to provide cooling fluid to more than one of the plurality of modules; wherein the fluid cooling system is a closed circuit system and includes a cooling arrangement to cool the fluid in the circuit, and a duct system to direct fluid to the modules; wherein the cooling system is configured so that fluid in the circuit is caused to pass through multiple modules before returning to the cooling arrangement.

Also disclosed is a modular plastic pipe formation apparatus to extrude plastic pipe comprising a plurality of modules wherein each module comprises at least one component of a pipe forming apparatus located therein, the apparatus further comprising a closed circuit fluid cooling system to provide cooling fluid to the at least one component of more than one of the plurality of modules, the cooling system comprising a cooling arrangement to cool the fluid in the circuit, the cooling arrangement comprising a chiller fluid circuit, a heat exchanger and a pre-cooling arrangement, wherein both the fluid cooling circuit and the chiller fluid circuit pass through the heat exchanger to cause cooling of the fluid in the fluid cooling circuit and the pre-cooling arrangement is arranged to cool fluid in the fluid cooling circuit prior to introduction into the heat exchanger.

In one form, the pre-cooling arrangement utilises the waste heat in the heated cooling fluid (prior to entering the heat exchanger) and/or allows for dissipation of heat to ambient temperature.

Also disclosed is a method of cooling extruded pipe formed in a plastic pipe formation apparatus, the method comprises providing a cooling circuit to cool the extruded pipe formed by the apparatus, wherein the cooling circuit runs counter to the direction of pipe formation so that cooling fluid in the circuit progressive heats as the cooling fluid passes along the extruded pipe.

BRIEF DESCRIPTION OF THE DRAWINGS

Notwithstanding any other forms which may fail within the scope of the apparatus, system and method as set forth in the summary, specific embodiments will now be described in which:

FIG. 5 is a plan view of the modules of the plastic pipe formation apparatus of FIG. 3;

FIG. 6 is a side view of the modules of the plastic pipe formation apparatus of FIG. 3;

FIG. 7 is an end view of a module of the plastic pipe formation apparatus of FIG. 3 with the end doors mounted for transportation;

FIG. 8 is a sectioned view of a module of the plastic pipe formation apparatus along section B-B in FIG. 6;

FIG. 9 is a sectioned view of a module of the plastic pipe formation apparatus along section C-C in FIG. 6;

FIGS. 11a-11e illustrate the top (FIG. 11a), side (FIG. 11b) and sectioned end view (FIG. 11c) of a second module of FIG. 5;

FIGS. 13a-13c illustrate the top (FIG. 13a), side (FIG. 13b) and sectioned end view (FIG. 13c) of a fourth module of FIG. 6;

FIGS. 15a-15c illustrate the top (FIG. 15a), side (FIG. 15b) and sectioned end view (FIG. 15c) of a sixth module of FIG. 6;

FIGS. 16a-16c illustrate the top (FIG. 16a), side (FIG. 16b) and sectioned end view (FIG. 16c) of a seventh module of FIG. 7;

FIGS. 17a-17b illustrate the top (FIG. 17a) and side view (FIG. 17b) of an external support for the modules;

DETAILED DESCRIPTION

Figure 1A:
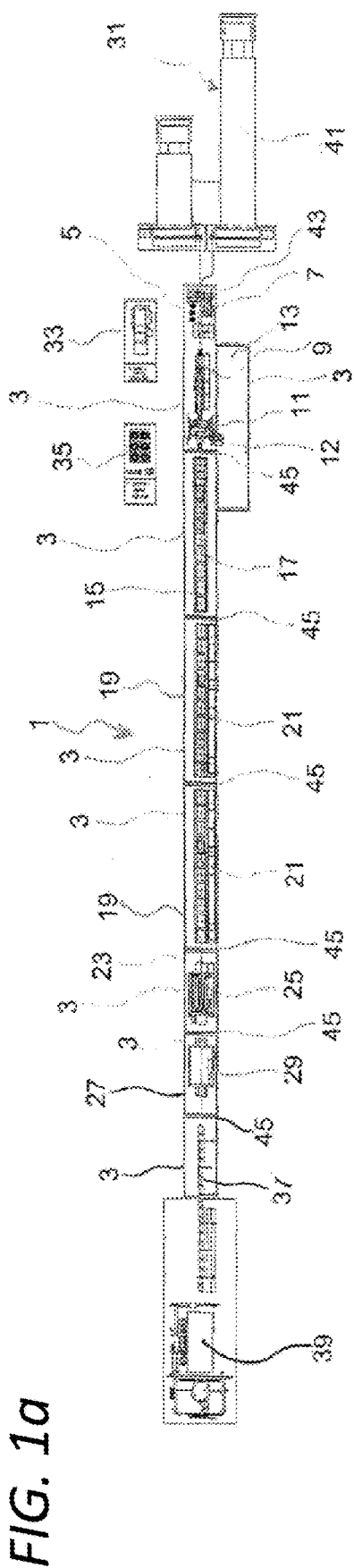
FIGS. 1a-1b are plan views of a modular plastic pipe formation apparatus according to a first embodiment.
Figure 1B:
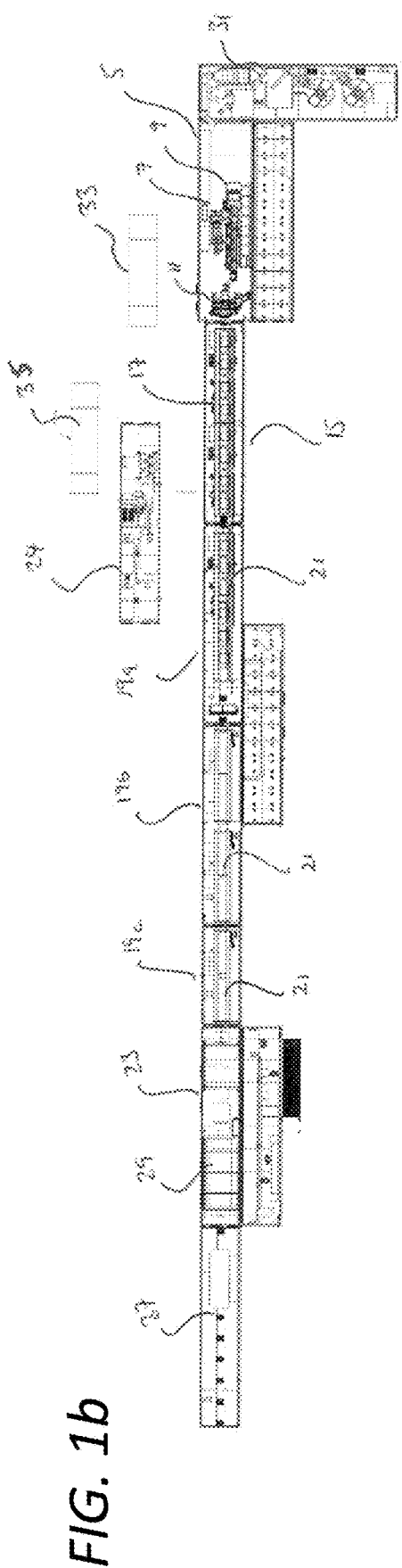

FIG. 1 illustrates a plan view of a modular plastic pipe formation apparatus 1 configured for smooth wall pipe production such as HDPE pipe. The pipe formation apparatus 1 comprises a series of modules 3, each comprising modified shipping containers, within which are disposed components of the pipe formation apparatus. The modules 3 are coupled to each other in a predetermined layout, allowing the components therein to be aligned for pipe production.

In the first module 5, there is provided a raw material dryer 7, screw extruder 9 and a die head 11. In the second module 15, there is provided a vacuum water tank 17. The third and fourth modules 19 house water cooling tanks 21. The fifth module 23 houses a haul off caterpillar, and the sixth module 27 houses a cutter 29.

In the embodiment shown in FIG. 1a, the third, fourth and fifth modules (19a, 19b, 19c) are cooling modules including cooling tanks 21. The sixth module 23 houses a haul off caterpillar and a cutter 29. The apparatus 1 also includes workspaces 27.

Other components for pipe production may include, a raw material feeding and storage component 31, a cooling circuit unit 24, a power generation unit 33, a chilling unit or chiller 35, pipe sliding table/tipping table 37 and a pipe coiler 39.

In pipe production, power and water is supplied to the first module 5 from the power generation unit 33 and cooling circuit unit 24. Raw plastic material is fed from the raw material feeding and storage component 31 to the raw material dryer 7, where the raw plastic material is dried before feeding into the hopper of the screw extruder 9. The raw plastic material is then heated and pressurised in the barrel of the screw extruder 9, thereby creating a polymer resin in a molten state. The molten polymer is then forced through the die head 11, thereby creating a pipe extrusion. The hot pipe extrusion enters and is drawn into vacuum water tank 17, where the vacuum assists in pulling the extrusion from the die head. A series of water spray nozzles within the vacuum water tank 17 sprays water to cool the newly extruded pipe, to aid in solidification.

To assist in passing the extruded plastic pipe through the pipe formation apparatus 1, the haul off caterpillar 25 pulls the solidified pipe from the water cooling tanks 21 and passes the pipe through the cutter 29. The cutter 29 cuts the pipe at intervals as selected by the operator, to provide pipe of desired length.

Figure 2A:
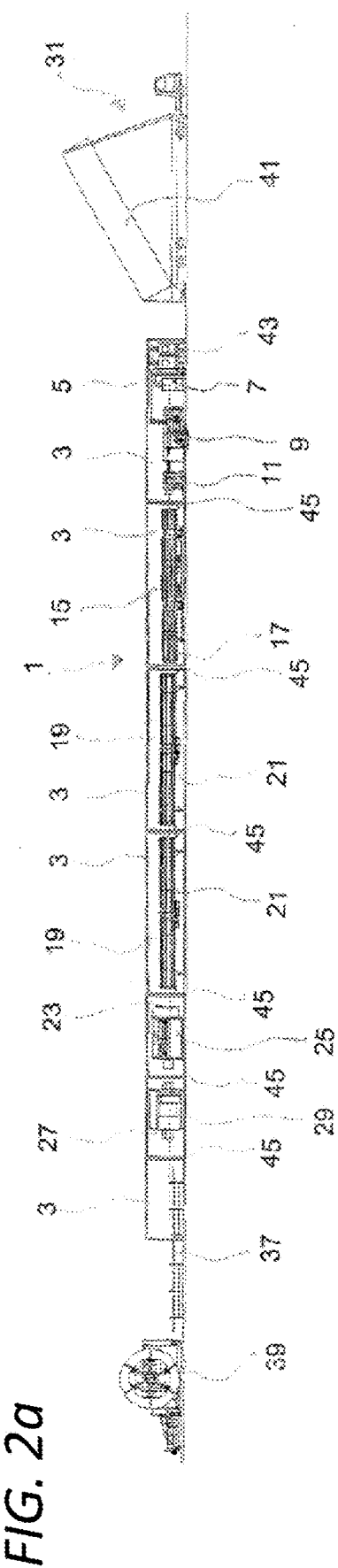
FIGS. 2a-2b are side views of the modular plastic pipe formation apparatus of FIG. 1.
Figure 2B:
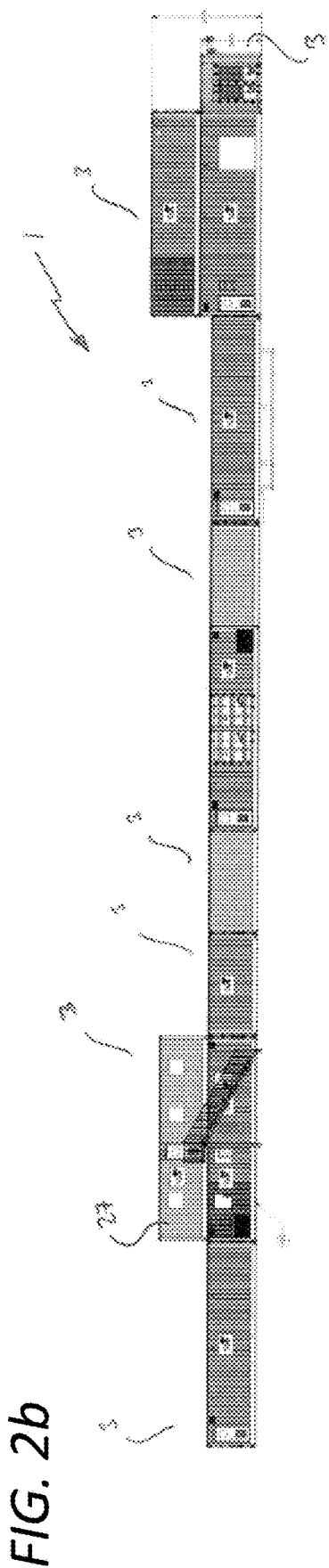
Figures 3, 4:
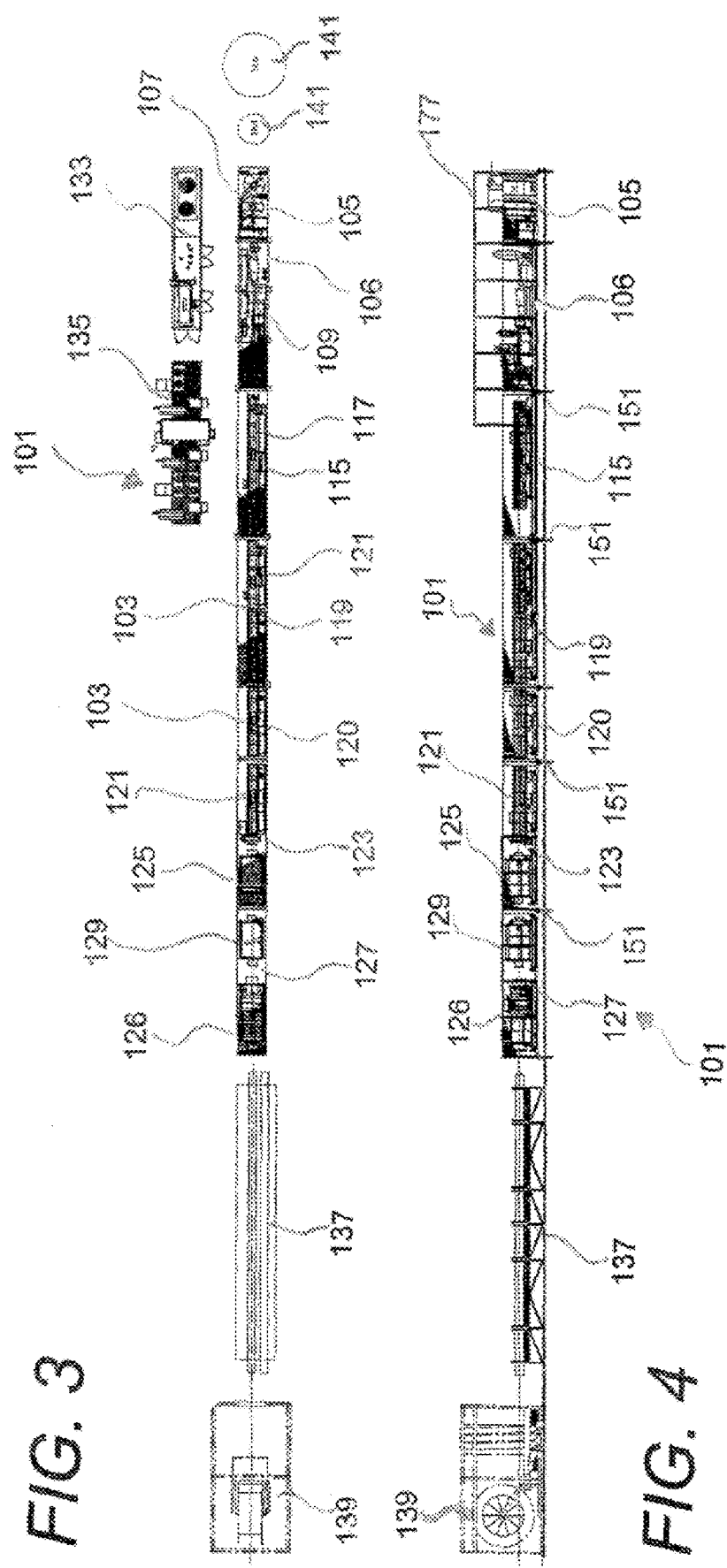
FIG. 3 is a plan view of a modular plastic pipe formation apparatus according to a second embodiment.
FIG. 4 is a side view of the modular plastic pipe formation apparatus of FIG. 3.
Figure 10C:
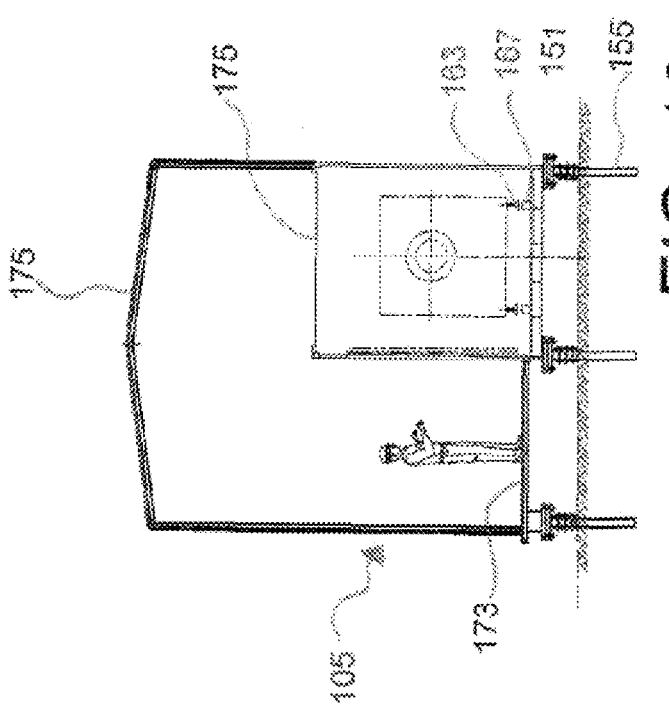
FIGS. 10a-10c illustrate the top (FIG. 10a), side (FIG. 10b) and sectioned end view (FIG. 10c) of a first module of FIG. 5.
Figure 10A:
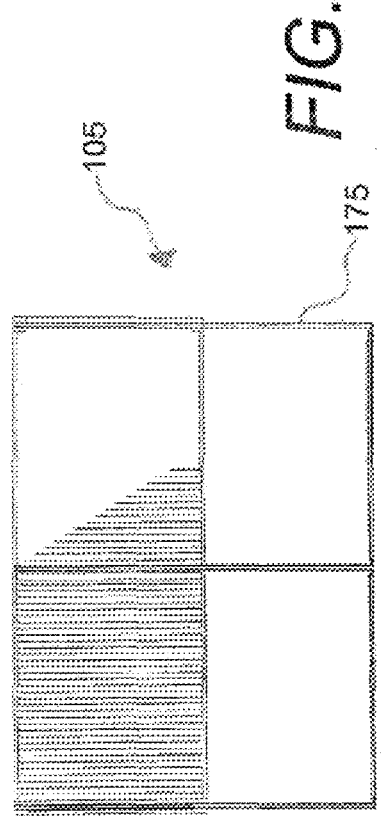
Figure 10B:
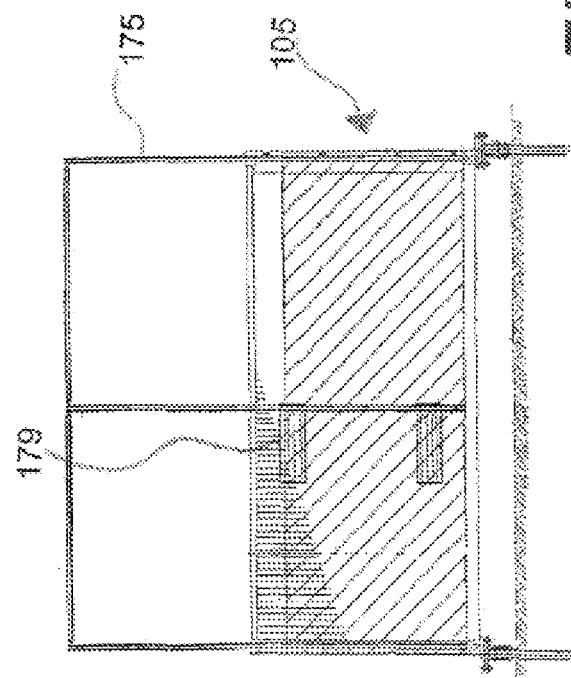
Figure 12C:
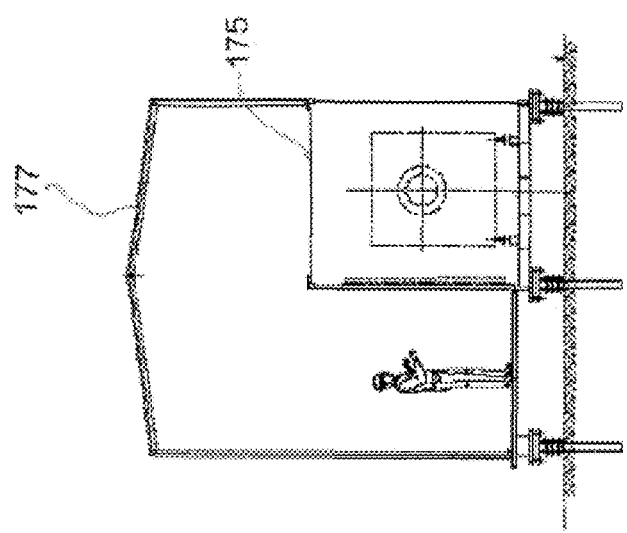
FIGS. 12a-12c illustrate the top (FIG. 12a), side (FIG. 12b) and sectioned end view (FIG. 12c) of a third module of FIG. 6.
Figure 12A:
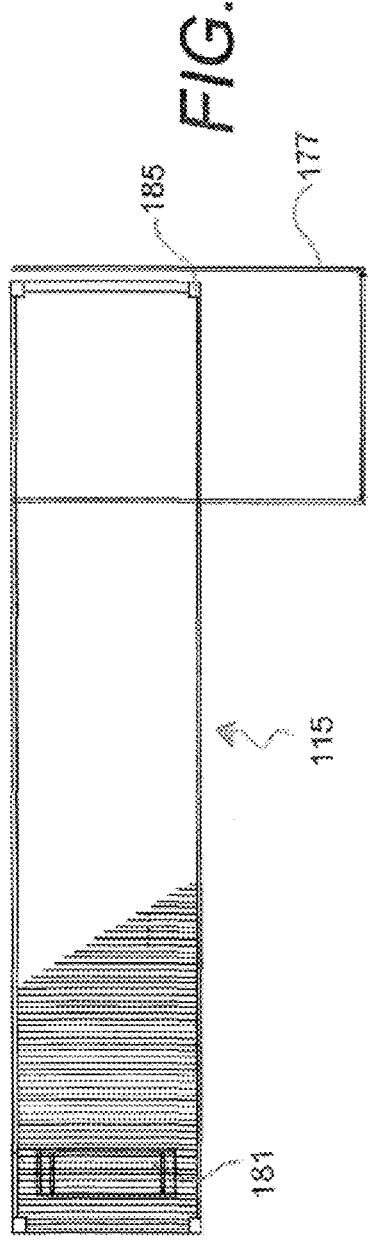
Figure 12B:
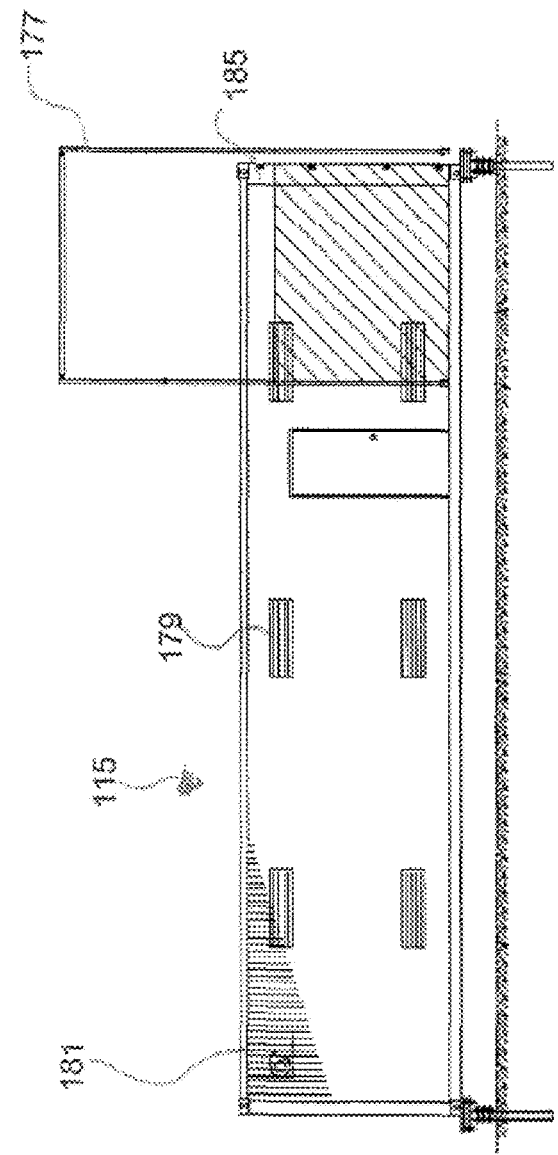
Figure 14A:
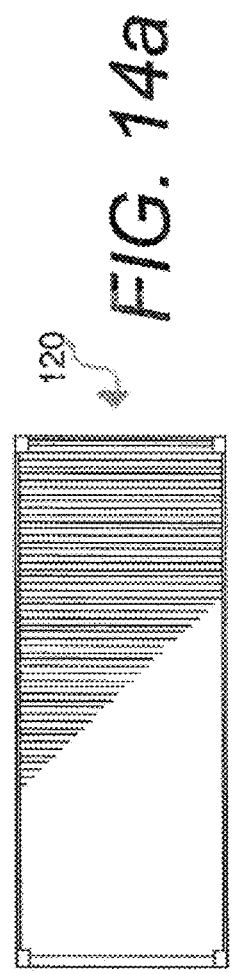
FIGS. 14a-14c illustrate the top (FIG. 14a), side (FIG. 14b) and sectioned end view (FIG. 14c) of a fifth module of FIG. 6.
Figure 14C:
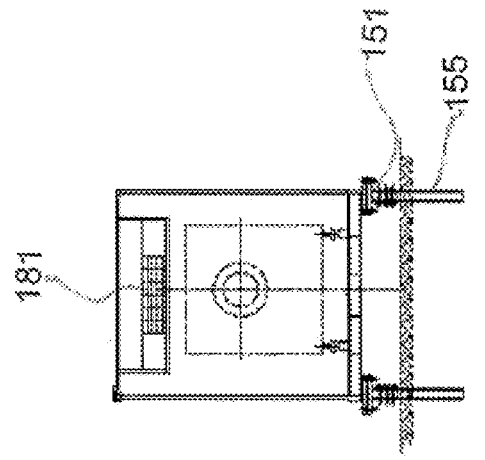
Figure 14B:
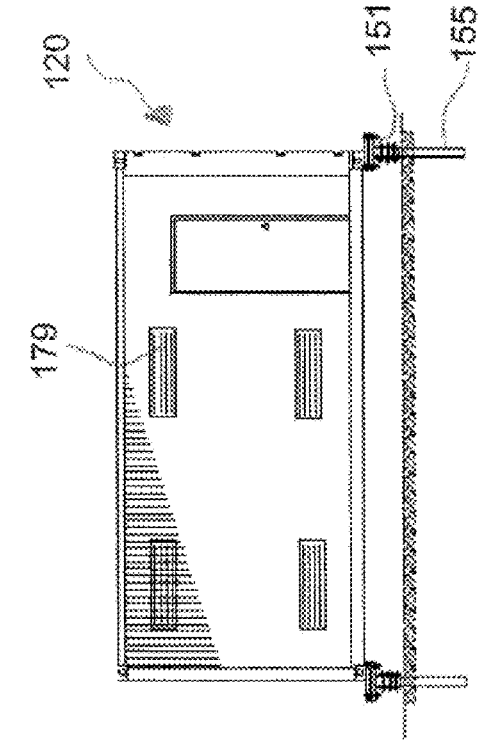

The finished pipe is then transferred to a pipe sliding table/tipping table 37 where the pipe is prepared for storage and/or transportation. For flexible pipes, this may include coiling the pipe on the coiler 39 as illustrated in FIGS. 1 and 2. For larger diameter pipes that cannot be coiled, the pipe may be lifted directly from the pipe sliding table/tipping table 37 to a storage area or a pipe transporter.

The components of the modules 3 will now be described in further detail.

The raw material feeding and storage component 31 comprises portable silos 41, e.g. of 10 to 50 tonne capacity. As illustrated in FIG. 2, the silo 41 may be tilted such that the raw material flows to the rear of the silo 41 to assist in extraction of the raw material. The raw material is extracted from the silo by pipe work or flexible hose with a suction unit, thereby sucking the raw material from the silo, and supplying it to bulker bags 43 for temporary storage before feeding to the raw material dryer 7.

The raw material dryer 7 dries the plastic raw material before feeding into the extruder 9. The raw material dryer may utilise power and heat from the power generation unit 33. Additionally or alternatively, hot air may be extracted from inside the freshly extruded pipe, and recycled to the raw material dryer 7 for drying of the plastic raw material. This can conserve energy by reducing or eliminating additional energy requirements for drying the raw material.

The extruder 9 may be a single or double screw extruder. This may be a commercial off-the-shelf unit, or a modified unit with reduced total output power to match the power generation unit 33. A suitable extruder may include extruders manufactured by BATTENFELD-CININNATI GmbH. Located with the die head 11, is a pipe head. The pipe head may have the ability to produce single, double or triple layer pipe. Various pipe sizes may be produced, including 400 mm, 630 mm, 1200 mm and 1600 mm diameter pipe.

Extruder line colourer 12, applies coloured lines to the extruded pipe for pipe marking and identification purposes. Although only one extruder line colourer 12 is illustrated, in other embodiments, more than one extruder line colourer 12 may be used. As illustrated in FIG. 1, the extruder line colourer 12 when configured for use, projects from the first module 5. Thus, an additional container 13 may be arranged adjacent to first module 5 to provide overhead protection to the extruder line colourer 12. Furthermore, container 13 may provide a working shelter for operators of the apparatus 1 whilst allowing them access to components of the apparatus 1.

The vacuum water tank 17 comprises a cylindrical tank in which the recently extruded pipe passes through. Inside the tank is a series of water sprays to cool the hot extruded plastic pipe. The ends of the cylindrical tank are provided with a rubber boot or flaps. The rubber boot or flaps permit the extruded pipe to enter the tank and at the same time forms an atmospheric seal between the inside of the tank and the surrounding atmosphere. Vacuum pumps are disposed below the cylindrical tank to provide a vacuum inside the cylindrical tank. Water and power to the tank is provided by a respective water and electrical circuit, which will be described further below.

The cooling water tanks 21, comprise a cylindrical tank provided with water sprays similar to the vacuum water tank 17. It would be appreciated that it is possible to use multiple vacuum water tanks 17 in place of the cooling water tanks 21.

The haul off caterpillar 25, comprises powered caterpillar tracks that grip the outer surface of the finished pipe to pull the pipe from the cooling tanks 21.

The cutter 29 and coiler 39 may be commercial off-the-shelf units. Ideally, the coiler 39 coils pipe with low ovality or deformation, such as the Low Ovality Technology coilers manufactured by PIPE COIL TECHNOLOGY LIMITED, UK.

The pipe sliding table 37 is adapted to receive and support cut pipe from the cutter 29, and may comprise rollers to assist in sliding. Alternatively, or in conjunction, a tipping table may be used to receive, and transfer sections of cut pipe to a pipe trolley, or other component.

The power generation unit 33, comprises either a diesel, petrol or gas generator disposed at a 20 or 40 foot shipping container. The container may further include a fuel tank for the generator. The module containing the power generation unit 33 may be adapted for outdoor or indoor use where it may be fitted with breather and exhaust piping.

Power from the power generation unit 33 is provided to the first module 5, where it is distributed to subsequent modules 3 of the apparatus 1. Each module 3, will have electrical power connectors to receiver power from a module, as well as distributing power to another connected module. That is, the first module 5 will be electrically connected to the second module 15, which in turn is electrically connected to the third module 19, etc. Advantageously, this reduces the need to connect each individual module 3 with an electrical power line from the power generation unit 33, and simplifies assembly of the pipe formation apparatus 1 at the production site. An exception is power supply to the chilling unit 35, where it may be advantageous to directly connect power from the power generation unit 33.

Alternatively, for production sites where electrical mains power is available, the apparatus 1 may receive electrical power from the mains source. Similar to the above mentioned embodiment, electrical mains power can be provided to the first module 5, where it will be distributed to subsequent modules 3.

The water chilling unit 35 may comprise an absorption refrigerator or a compressor refrigerator inside a 20 or 40 foot shipping container. The container may further include a water tank, and the water chilling unit may be adapted for outdoor or indoor use. Optionally, the water chilling unit may be connected to, or co-located with, the power generation unit 35.

The water chilling unit 35 is piped to the first module 5, and cools water for a closed circuit water supply for the apparatus 1. The water circuit comprises a cool water line and a hot water line running parallel to modules 5, 15 and 19. The modules 5, 15 and 19 have height adjustable hot and cold pipes disposed therein, and the pipes are coupled to each other to form part of the closed water circuit. The closed water circuit provides water to the water cooling tanks 21, vacuum water tank 17, and components in module 5.

Alternatively, for production sites with an existing water circuit, the apparatus 1 may exchange cool and hot water with the existing water circuit. Similar to the water circuit described in the embodiment above, the water circuit can be connected to the first module 5, where it will be coupled to the pipes of subsequent modules 3.

Optionally, a corrugator, either disposed in the first module 5, or in a separate module, may be positioned between the die head 11 and the vacuum water tank 17. The corrugator may be a commercial off-the-shelf system, such as the DROSSBACH HD series manufactured by DROSSBACH GmbH, or ITIB corrugator series manufactured by ITIB MACHINERY INTERNATIONAL S.p.A. The corrugator, in use, moves back and forth axially to the extruded pipe. In an embodiment, part of the corrugator may envelope part of the die head 11. In a further embodiment, part of the corrugator may protrude from a corrugator module and into the first module 5. Alternatively, the die head 11 may extend from the first module 5, and protrude into the corrugator module.

Generally, each module 3 is provided with a lock 45 to allow adjacent modules 3 to be locked to one another. This ensures the modules are correctly arranged with respect to each other during pipe formation. Furthermore, an adjustment mechanism such as a winch may be used for pulling modules together. Thus, modules can be placed in close proximity to each other, and the winch may then pull modules together before the locks 45 are engaged.

The components within each module 3 are also adjustable in position or angle with respect to the module they are disposed in. In one form, the components are supported by adjustable jacks on top of the module floor. Adjustment may either be mechanical, hydraulic, electro-mechanical or, by other suitable actuation means. Furthermore, actuation may be automated or semi-automated, and controlled by a computer. The adjustability of components within each module allows alignment of the components when the modules themselves are not perfectly aligned.

A referencing laser may be used to determine the relative positions of the modules 3 or components, and provide information to allow corrections to the position of the modules 3 or components therein. The laser may be set up at either or both ends of the apparatus 1, with the laser directed co-axially to the pipe extrusion axis.

In one embodiment, witness panes in the path of the laser beam may be attached to the components and/or modules. The location of the laser reflection on the panes will thus provide information on the position of the components and/or modules relative to the reference laser. It should be appreciated that other methods of alignment may be used (e.g. sight gauges).

The modules 3 are generally modified 20 foot or 40 foot shipping containers. In one form, the sides or top of the modules may have doors to allow ventilation during pipe formation. In another form, the modules may be an open frame, and the top and/or sides may simply be left open during transportation, or covered with a tarpaulin.

A second embodiment of the modular plastic pipe formation apparatus 101 is illustrated in FIGS. 3 to 16. Features corresponding to those presented previously discussed are similarly numbered with "100" preceding the similar feature.

In the apparatus 101 of the second embodiment, the raw material dryer 107 is contained in a separate first module 105. The second module 106, contains the screw extruder 109 and the die head. The third module 115, fourth module 119 and fifth module 120 contain vacuum water tanks 117 and/or water cooling tanks 121. The sixth module 123 contains a water cooling tank 121 and a haul off caterpillar 125. The seventh module 127 contains a cutter 129 and a second haul off caterpillar 126. A second haul off caterpillar assists in pulling longer pipes.

The modules 103 of the apparatus 101 generally comprise modified 20 foot and 40 foot containers. The modules 103 are supported by external supports 151, comprising adjustable jacks 153 supported by screw piles 155 driven into the ground.

The external support 151 is shown in more detail in FIG. 17. The screw pile 155 is selected from a type, size and length suitable to support the weight of the modules 103 for the underlying ground. The adjustable jack 153 comprises of a top plate 157, bottom plate 153 and adjustment bolts 161. The adjustment bolts 161 allow adjustment of the height of the supported modules 103. The top plate 157 is sufficient span to support two adjoining modules at their respective ends as illustrated in FIG. 6. However, it is to be appreciated that additional external supports 151 may be used at locations along the intermediate length of the modules 103 as required. Furthermore the span of the top plate 157 also enables a degree of lateral displacement to enable adjacent modules 103 to be aligned.

Advantageously, the external supports 151 elevate the modules 103 above the underlying ground which assists in drainage if the apparatus 101 is located outdoors. Furthermore, the use of piles reduces the need for a flat hard surface to support the modules. Thus, less preparation is required at the pipe manufacturing site. In addition, the apparatus may be set up in areas with poor ground soil quality (e.g. softer, sandy, loamy, uncompacted, etc soil or ground).

Figure 18A:
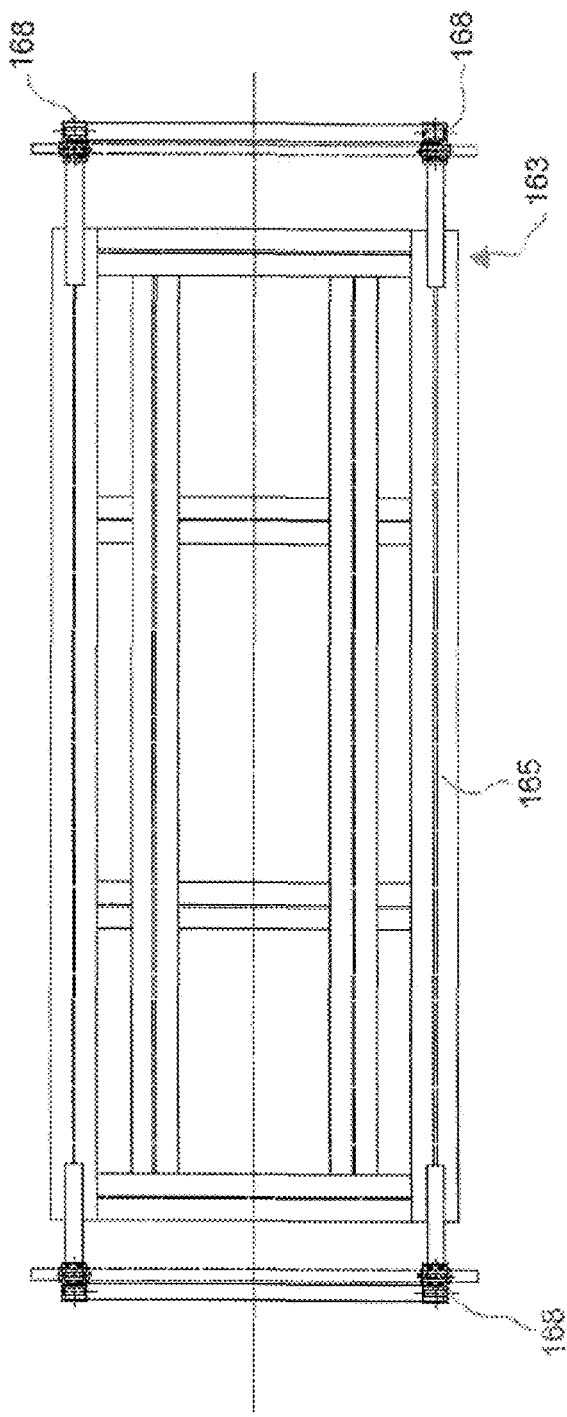
FIGS. 18a-18b illustrate the top (FIG. 18a) and side view (FIG. 18b) of an internal support frame.
Figure 18B:
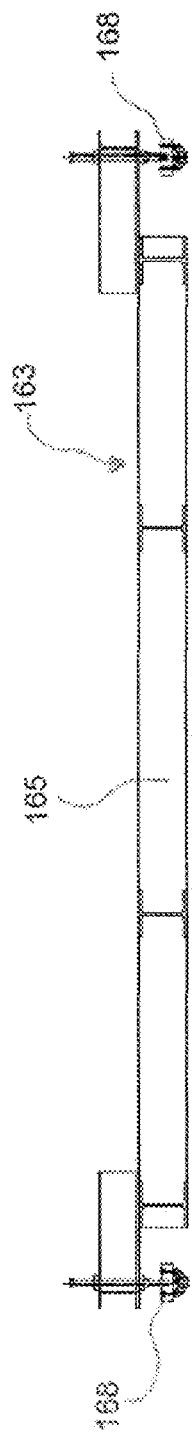

An internal support frame 163 for supporting components within a module 103 is best illustrated in FIG. 18. The support frame 163 comprises a frame body 165 and adjustable locking mounts 168. The adjustable locking mounts 168 are mountable to the floor reinforcements 167 on the floor of the modules 103. The adjustable locking mounts 168 enable the frame to be linearly and angularly displaced as required to ensure the components in the modules 103 are aligned.

The modules 103 will now be described with reference to FIGS. 5 to 16. As illustrated in FIG. 7, the modules are reduced to standard shipping container sizes during transportation. This may include attaching removable container doors 171. The doors 171 are typically removed before assembly of the apparatus 101.

FIG. 8 illustrates a sectioned view of module 106, as an example of an open in-use configuration of a module 103. The module 106 has a fold down side wall 173, which folds down to rest on an external support 151. The fold down side wall 173 can then function as a floor for technicians to access the apparatus 101.

The module 106 is also provided with an open top section 175. This allows components of the apparatus 101 to extend above the top section of the module 106 when configured for use. This also advantageously improves ventilation within the module. To ensure the apparatus is protected from weather, including rainwater and dust, a surrounding canvas awning 177 is provided above and around the open top section 175, extending to the fold down side wall 173. This ensures the technicians as well as the components are protected from external elements. FIG. 9 illustrates an alternative awning 178, where the awning extends outwardly from the top of the module 127.

Between the ends of each module 103 there is provided a rubber concertina-like boot. This ensures a weather, water and dust proof seal between adjoining modules 103. The boot may be attached to each end of the module 103 by bolts.

On the modules 103 has enclosed tops. The tops may be angled toward the longitudinal centre of the module, and to one side. This ensures drainage of rainfall is directed away from the boot sealing the ends of the adjacent modules 103, thus reducing the chance of water leaking into the modules 103.

The modules 103 are provided with ventilation louvers 179 to assist in ventilation of the apparatus 101. Furthermore, air-conditioning units 181 may be provided to regulate the temperature within the apparatus 101.

Between modules 106 and 115, the vertical beams 183 and 185 at the adjoining ends may be removable. This facilitates access to the die head which is located in the region of the adjoining ends. To maintain structural integrity of the modules 106 and 115, an additional vertical beam may be located at an alternative location.

To establish a mobile plastic pipe formation site, a suitable site is first located. The site may be outdoors in the open, under covered shelter, or indoors. Generally, a flat ground, at least the size of the apparatus is required. The ground can be a hard surface, such as bitumen or concrete. Alternatively, a screw pile and adjustable jacks may be used to support the modules. This latter approach is especially suitable for softer ground. The modules, in the form of transportable containers are delivered to the site. Since the containers have features of standard 20 or 40 foot containers, existing transportation and handling equipment can be used.

Once the modules 3 are transported to the production site, the modules may be configured from their transportation state to a pipe production state. This may include opening and/or removing the container doors 171, and removing any packing or protective equipment required during transportation.

The modules 3 are then arranged as required in the predetermined manner at the production site. The modules 3 are then drawn into close proximity with each other using a winch, and then locked together.

Alternatively, two modules are first arranged in the predetermined manner (above) at the site. The two modules are then drawn to close proximity using a winch, and then locked together. A further module is then arranged as required in the predetermined manner. The further module is then positioned in close proximity to the first two modules that have been locked. The further module is then drawn towards the first two modules with a winch, and then locked. This can be repeated until all modules required have been arranged and locked as required.

When all the modules have been arranged and locked, the components supported by the modules may then be adjusted in position and aligned to each other. As described above, this may be done manually or autonomously, and may be aided with a reference laser.

The electrical connectors and the coupling for the water pipes between each module 3 are then connected, to provide power and water for the modules. Once this is completed, and water, power and raw plastic materials are supplied to the apparatus 1, the plastic pipe formation site is established and pipe formation operations can commence.

Figure 19:
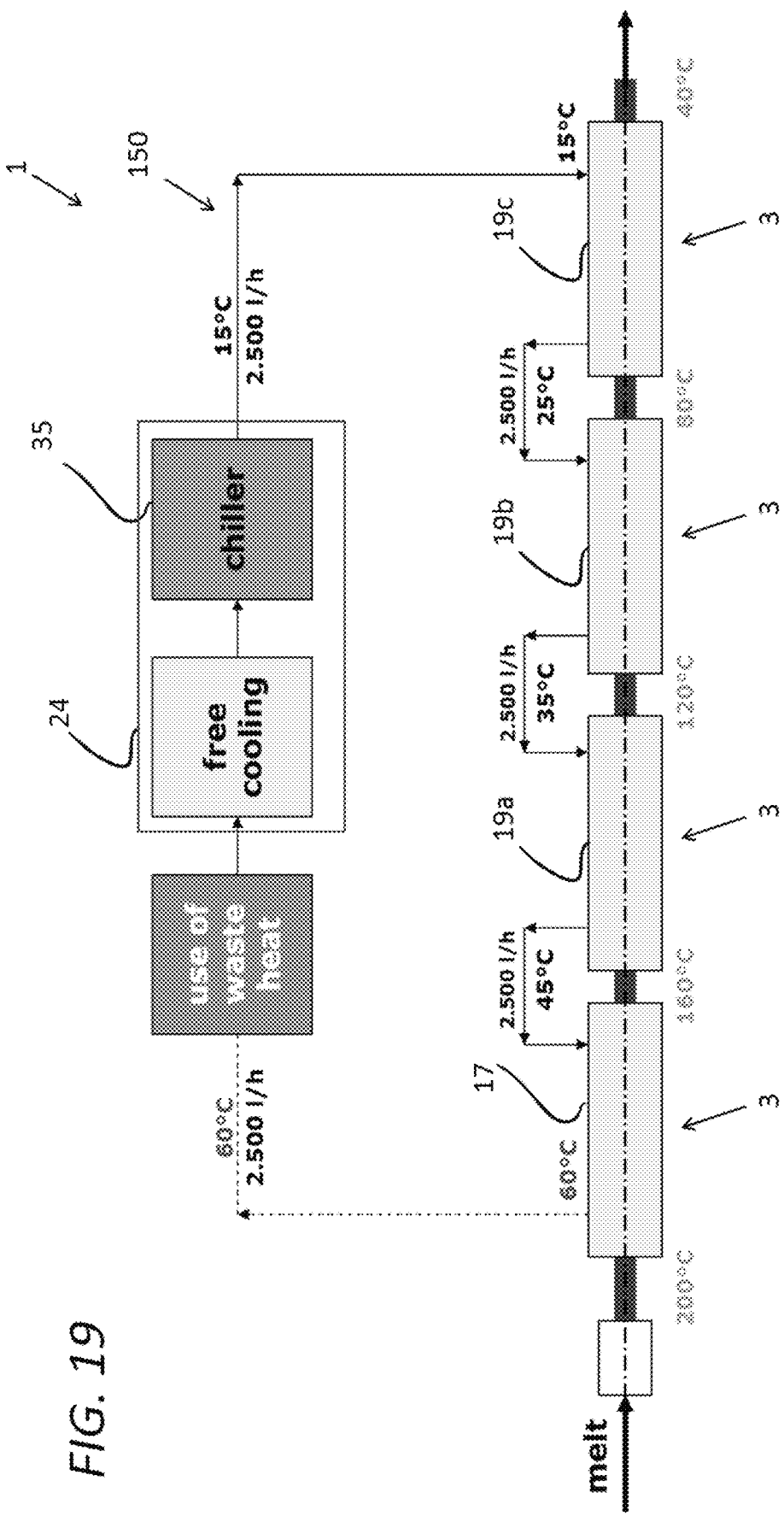
FIG. 19 schematically illustrates a closed-circuit cooling water supply for the plastic pipe formation apparatus.

FIG. 19- to 20b disclose a further embodiment of closed circuit water supply 150 for the modular pipe formation apparatus 1, 101 which provides for more efficient power and water usage. For convenience, like features use the references of the first embodiment of the apparatus 1, but the further embodiment disclosed is equally applicable to the second embodiment of apparatus 101.

In the illustrated embodiment of the closed-circuit cooling water supply 150, the water chilling unit 35 is connected by piping to the cooling circuit unit 24. Water from the chilling unit 35 flows into the cooling circuit unit 24 and circulates therebetween. The cooling circuit unit 24 in turn distributes cold water (cooled by interaction with the water from the chilling unit) through the closed-circuit water supply 150 to modules 3 in the modular plastic pipe formation apparatus 1. The arrangement and method of cooling the pipe extrusion is described in further detail now.

The closed-circuit cooling water supply 150 is shown schematically in FIG. 19. The cooling circuit 150 incorporates the cooling circuit unit 24 wherein water passing through the circuit is stored, cooled, treated, and pumped into the circuit 150. The cooling circuit 150 flows in a counter direction to the direction of pipe formation and as shown the water from the unit 24 is piped to the cooling module 19c then by coupling in sequence, is distributed through subsequent modules 3 of the apparatus 1, i.e. the cooling module 19c will be connected to the cooling module 19b, which in turn is connected to the third cooling module 19a, connected to the vacuum tank 17.

Water is cycled through the closed-circuit water supply 150 by entering the module 19c from the cooling unit 24, at about 15 degrees Celsius. The water flows in a direction opposite to the pipe extrusion moving through modules 3. The water flows in sequence from one module to the next, increasing in temperature by approximately 10 degrees Celsius to where it finally exits the module 17 at about 60 degrees Celsius. At this final stage, the water is substantially heated and is to be cooled before re-entering the module 19c to complete the closed-circuit.

The heated water in the closed-circuit supply 150 is cooled by various methods. As shown schematically in FIG. 19, three processes may be involved. A first process is by using the waste heat in the pipe formation apparatus (e.g. drying the raw material, heating the injection barrel of the pipe extruder). A second process is by exposure to ambient temperature or other external environments. The third process is by interacting with the chiller unit fluid which happens via a heat exchanger arrangement in cooling circuit unit 24. The cooling circuit unit 24 will now be described in further detail.

Figure 20A:
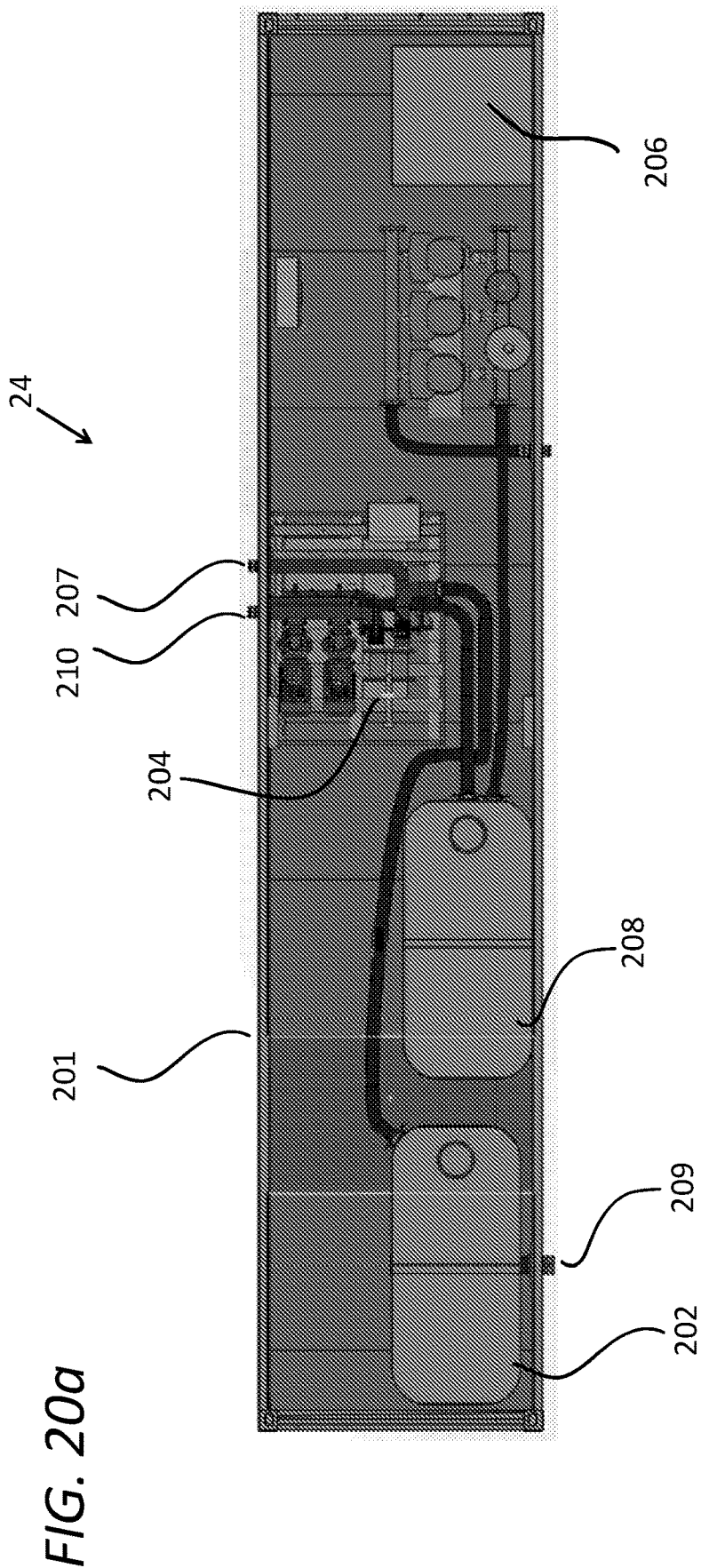
FIG. 20a illustrates the top view of the cooling circuit unit of FIG. 19.
Figure 20B:
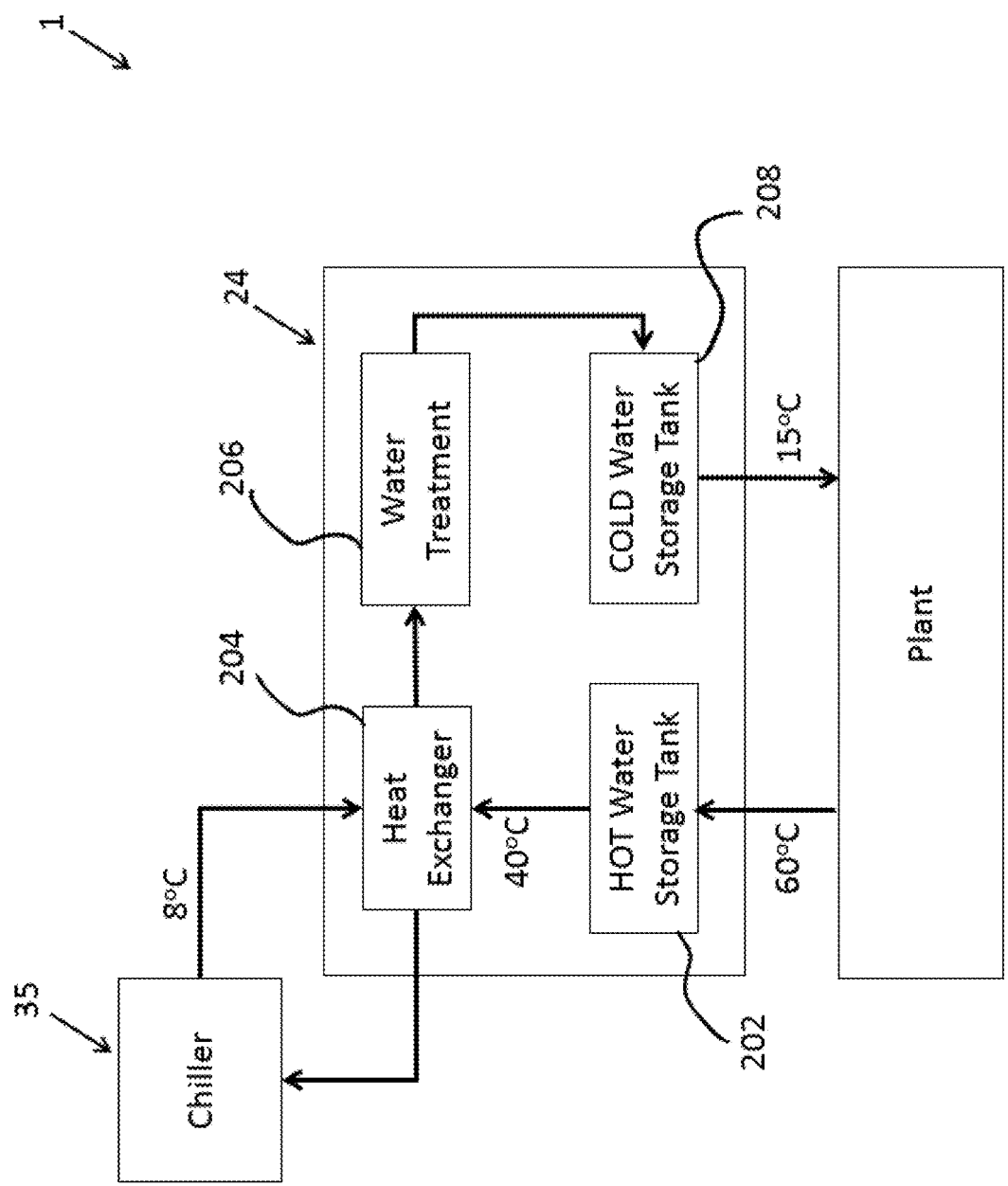
FIG. 20b schematically illustrates the cooling circuit unit of FIG. 19.

As shown in FIG. 20a, the cooling circuit unit 24 is typically housed within one of the modules 3, typically being a transportable container 201. The circuit 24 includes heat exchangers 204, hot water storage tanks 202, cold water storage tanks 208 and water treatment units 206. The heat exchangers are connected to the water supply circuit 150 and a chiller circuit that allows chilled water from chiller 35 to pass into the heat exchanger through inlet port 207 exit through outlet port 210 to cool the heated water returning in circuit 150. In one illustrative form, water exiting the vacuum tank 17 is a approximately 60 degrees Celsius and may be utilized in a waste heat capture process where after it enters the cooling circuit unit 24 through port 209 and is stored in hot water storage tank 202 before entering heat exchanger 204. When in the tank 202, the water is able to cool further. Typically, the water temperature entering the heat exchanger may be in the order of 40 degrees Celsius. The chiller 35 circulates cold water at approximately 8 degrees Celsius into the heat exchangers 204 where it cools water circulating through the closed-circuit water supply. Water in the closed-circuit water supply then passes through a water treatment process, i.e., water softening, and is then stored in the cold water storage tank 208 before it is recirculated through the series of modules 3, via port 211. Water exiting the free cooling unit 24 is approximately 15 degrees Celsius.

This arrangement of sequential flow through modules 3 inherently reduces the volume flow of cooling liquid through apparatus 1 as compared to if the modules were connected into the circuit in parallel. This is advantageous for the conservation of space for holding water tanks in the small confines of the module 3. Another main advantage is that the energy used in cooling the pipes is significantly reduced. It has been found that the energy used by the chiller can be reduced as the heat that needs to be removed from the water by the chiller may be reduced by 80% (in tests conducted by the applicant the heat requiring removal reduced from 20.6 kW to 0.8 kW) because of the ability to use the waste heat in the heated water supply and through passive cooling.

In any of the forms of modular pipe formation apparatus described above, hen plastic pipe formation at the site is complete, the pipe formation apparatus can be moved to a new site. This involves decoupling the electrical connectors, water pipes and modules. The modules are then configured to a transportable state, such as attaching and/or closing doors, adding packing or protective equipment, and adjusting position of components so they fit within the shipping container dimensions. The modules may then be transported to the new production site, and the method of establishing a plastic pipe formation site described above is repeated.

In projects where a long continuous pipeline is required, the plastic pipe formation apparatus may be intermittently moved along the proposed pipeline as the pipe is laid. That is, a first mobile pipe manufacturing site is located near the start of the pipeline, and pipe is formed, transported and the pipe laid. As the front of the pipe laying site advances forward, the formed pipe needs to be transported further from the pipe manufacturing site to the pipe laying site. Thus, the time and cost of transportation of pipe increase. It may then be economical to relocate the pipe formation apparatus 1 to another site closer to the advancing pipe laying site, or even ahead of it. Alternatively, a second pipe formation apparatus can be located at the new site, with the first apparatus being readied for a third site, etc. Thus the apparatus provides a mobile pipe manufacturing site which advantageously allows pipe production to keep up with the pipe laying site.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the apparatus, system and method.

It is to be understood that, if any prior art publication is referred to herein, such reference does not constitute an admission that the publication forms a part of the common general knowledge in the art, in Australia or any other country.

The invention claimed is:

1. A modular plastic pipe formation apparatus to extrude plastic pipe comprising a plurality of modules in the form of transportable containers wherein each module comprises at least one component of a pipe forming apparatus located therein, the apparatus further comprising a closed circuit fluid cooling system to provide cooling fluid to at least some of the plurality of modules; the closed circuit fluid cooling system comprising a further module in the form of a transportable container, and a hot water storage tank, a cold water tank and a heat exchanger housed within the further module, wherein the cooling circuit system has an inlet port to the further module from a first of the at least some of the plurality of modules and an exit port from the further module to a second of the at least some of the plurality of modules and wherein the cooling fluid flows through the at least some of plurality of the modules in a counter direction to a direction of pipe forming in the pipe formation apparatus.

2. A modular plastic pipe formation apparatus according to claim 1, wherein the modules that receive fluid from the fluid cooling circuit system are cooling modules that are arranged to receive and cool extruded plastic pipe that passes therethrough.

3. A modular plastic pipe formation apparatus according to claim 1, further comprising a cooling arrangement to cool the fluid in the cooling circuit system.

4. A modular plastic formation apparatus according to claim 3, wherein the cooling arrangement comprises a chiller fluid circuit, both the fluid of the cooling circuit system and the chiller fluid circuit pass through the heat exchanger to cause cooling of the fluid in the fluid cooling circuit system.

5. A modular plastic formation apparatus according to claim 4, wherein the cooling arrangement further comprises a pre-cooling arrangement that cools heated fluid in the fluid cooling circuit system prior to introduction into the heat exchanger.

6. A modular plastic pipe formation apparatus according to claim 1, wherein the transportable container of at least one of the plurality of modules and the further module comprises:
   i. a standardised shipping container modified for use in the apparatus; or
   ii. a container or supporting framework for use in the apparatus and having at least some of the features of a standardised shipping container to facilitate its transportation.

7. A modular plastic pipe formation apparatus to extrude plastic pipe comprising a plurality of modules in the form of transportable containers wherein each module comprises at least one component of a pipe forming apparatus located therein, the apparatus further comprising:
   a closed circuit fluid cooling system to provide cooling fluid to the at least one component of more than one of the plurality of modules, the fluid cooling system comprising a further module in the form of a transportable container, and a hot water storage tank, a cold water tank and a heat exchanger housed within the further module, the cooling circuit system having an inlet port to the further module from a first of the more than one of the plurality of modules and an exit port from the further module to a second of the more than one of the plurality of modules; and
   a cooling arrangement to cool the fluid in the closed circuit fluid cooling system, the cooling arrangement comprising a chiller fluid circuit and a pre-cooling arrangement, wherein both the fluid of the cooling circuit system and the chiller fluid circuit pass through the heat exchanger to cause cooling of the fluid in the fluid cooling circuit system and the pre-cooling arrangement is arranged to cool heated fluid in the fluid cooling circuit system prior to introduction into the heat exchanger.

8. A modular plastic pipe formation apparatus according to claim 7, wherein at least one of the plurality of modules comprising a cooling tank as one component of that module.

9. A modular plastic pipe formation apparatus according to claim 7, wherein the modules that receive cooling fluid are provided in series to receive extruded plastic pipes therein for cooling.

10. A modular plastic pipe formation apparatus according to claim 7, further comprising a chiller to chill the fluid in the chiller fluid circuit.

11. A modular plastic formation apparatus according to claim 10, wherein the chiller is separate to the further module of the fluid cooling system.

* * * * *